(12) United States Patent
Eich et al.

(10) Patent No.: US 9,430,945 B2
(45) Date of Patent: Aug. 30, 2016

(54) SYSTEM AND METHOD FOR PROVIDING ROUTE CALCULATION AND INFORMATION TO A VEHICLE

(75) Inventors: Rodger W. Eich, Holland, MI (US); Brian L. Douthitt, Holland, MI (US); Richard J. Chutorash, Oakland Township, MI (US); John D. Spencer, Allendale, MI (US)

(73) Assignee: Johnson Controls Technology Company, Holland, MI (US)

( * ) Notice: Subject to any disclaimer, the term of this patent is extended or adjusted under 35 U.S.C. 154(b) by 1552 days.

(21) Appl. No.: 12/519,735

(22) PCT Filed: Dec. 19, 2007

(86) PCT No.: PCT/US2007/088171
§ 371 (c)(1),
(2), (4) Date: Nov. 19, 2009

(87) PCT Pub. No.: WO2008/079889
PCT Pub. Date: Jul. 3, 2008

(65) Prior Publication Data
US 2010/0100310 A1 Apr. 22, 2010

Related U.S. Application Data

(60) Provisional application No. 60/875,828, filed on Dec. 20, 2006, provisional application No. 60/876,092, filed on Dec. 20, 2006, provisional application No. 60/876,281, filed on Dec. 21, 2006, provisional application No. 60/889,212, filed on Feb. 9, 2007.

(51) Int. Cl.
*G01C 21/34* (2006.01)
*G08G 1/0968* (2006.01)
*G01C 21/36* (2006.01)

(52) U.S. Cl.
CPC ..... *G08G 1/096811* (2013.01); *G01C 21/3661* (2013.01); *G01C 21/3688* (2013.01); *G08G 1/096861* (2013.01); *G08G 1/096866* (2013.01); *G08G 1/096872* (2013.01)

(58) Field of Classification Search
CPC .......... G01C 21/3661; G01C 21/3688; G01C 21/34; G01C 21/3667; G01C 21/3691; G08G 1/0969; G08G 1/096716; G08G 1/0133; B60G 17/0195; B60Q 9/00; H04M 3/42229; H04W 4/02; G06F 17/30241; H04L 67/18
USPC ......... 701/208, 209, 49, 425, 428, 440, 468, 701/533, 1, 117, 118, 41; 340/988, 995.13, 340/539.13; 342/357.31, 357.51; 381/86; 463/6; 455/456.2, 41.2, 456.1
See application file for complete search history.

(56) References Cited

U.S. PATENT DOCUMENTS

| | | |
|---|---|---|
| 4,390,877 A | 6/1983 | Curran |
| 4,760,394 A | 7/1988 | Takeuchi et al. |

(Continued)

FOREIGN PATENT DOCUMENTS

| | | |
|---|---|---|
| EP | 0 660 542 A1 | 6/1995 |
| EP | 1 052 609 A1 | 11/2000 |

(Continued)

OTHER PUBLICATIONS

Office Action for European Patent Application No. 08 705 741.0, dated Jan. 13, 2010, 3 pages.

(Continued)

*Primary Examiner* — Yuri Kan
(74) *Attorney, Agent, or Firm* — Foley & Lardner LLP

(57) ABSTRACT

A system for mounting in a vehicle and for providing route information calculated by a remote source (116) to a display is provided. The system includes a display interface (124) for providing a signal to the display (108). The system further includes a communications device (120). The system yet further includes a processor (122) operatively coupled to the communications device (120) and the display interface (124), wherein the processor (122) is configured to cause vehicle position information to be sent to the remote source (116) via the communications device (120). The processor is further configured to receive route information from the remote source (116) via the communications device (120). The processor (122) is yet further configured to provide a representation of the route information to the display interface (124), the route information conveying directions from a position of the vehicle to a destination.

19 Claims, 12 Drawing Sheets

(56) References Cited

U.S. PATENT DOCUMENTS

| | | | |
|---|---|---|---|
| 4,792,796 A | 12/1988 | Bradshaw et al. | |
| 4,825,200 A | 4/1989 | Evans et al. | |
| 4,827,520 A | 5/1989 | Zeinstra | |
| 5,113,182 A | 5/1992 | Suman et al. | |
| 5,278,547 A | 1/1994 | Suman et al. | |
| 5,475,366 A | 12/1995 | Van Lente et al. | |
| 5,479,155 A | 12/1995 | Zeinstra et al. | |
| 5,479,157 A | 12/1995 | Suman et al. | |
| 5,583,485 A | 12/1996 | Van Lente et al. | |
| 5,614,885 A | 3/1997 | Van Lente et al. | |
| 5,614,891 A | 3/1997 | Zeinstra et al. | |
| 5,619,190 A | 4/1997 | Duckworth et al. | |
| 5,627,529 A | 5/1997 | Duckworth et al. | |
| 5,646,701 A | 7/1997 | Duckworth et al. | |
| 5,661,455 A | 8/1997 | Van Lente et al. | |
| 5,691,848 A | 11/1997 | Van Lente et al. | |
| 5,699,044 A | 12/1997 | Van Lente et al. | |
| 5,708,415 A | 1/1998 | Van Lente et al. | |
| 5,717,387 A | 2/1998 | Suman et al. | |
| 5,854,593 A | 12/1998 | Dykema et al. | |
| 5,903,226 A | 5/1999 | Suman et al. | |
| 5,907,796 A | 5/1999 | Matchett et al. | |
| 5,926,087 A | 7/1999 | Busch et al. | |
| 6,010,403 A * | 1/2000 | Adam et al. | 463/6 |
| 6,020,654 A | 2/2000 | Chutorash | |
| 6,028,537 A | 2/2000 | Suman et al. | |
| 6,067,681 A | 5/2000 | Zeinstra et al. | |
| 6,144,114 A | 11/2000 | Chutorash | |
| 6,154,148 A | 11/2000 | Fluharty et al. | |
| 6,181,255 B1 | 1/2001 | Crimmins et al. | |
| 6,188,889 B1 | 2/2001 | Tsai | |
| 6,212,474 B1 * | 4/2001 | Fowler et al. | 701/440 |
| 6,282,152 B1 | 8/2001 | Kurple | |
| 6,282,407 B1 | 8/2001 | Vega et al. | |
| 6,336,031 B1 | 1/2002 | Schyndel | |
| 6,374,182 B2 * | 4/2002 | Bechtolsheim et al. | 701/428 |
| 6,430,164 B1 | 8/2002 | Jones et al. | |
| 6,472,771 B1 | 10/2002 | Frese et al. | |
| 6,539,358 B1 | 3/2003 | Coon et al. | |
| 6,556,813 B2 | 4/2003 | Tsui | |
| 6,584,319 B1 | 6/2003 | Girod | |
| 6,603,405 B2 | 8/2003 | Smith | |
| 6,611,358 B1 | 8/2003 | Narayanaswamy | |
| 6,615,023 B1 | 9/2003 | Ehrensvard | |
| 6,697,638 B1 | 2/2004 | Larsson et al. | |
| 6,771,749 B1 | 8/2004 | Bansal et al. | |
| 6,825,751 B1 | 11/2004 | Kita et al. | |
| 6,978,126 B1 | 12/2005 | Blaker et al. | |
| 6,985,934 B1 | 1/2006 | Armstrong et al. | |
| 7,050,593 B1 * | 5/2006 | Emerling et al. | 381/86 |
| 7,050,834 B2 | 5/2006 | Harwood et al. | |
| 7,110,537 B2 | 9/2006 | Mazzara, Jr. | |
| 7,116,229 B1 | 10/2006 | Miramontes | |
| 7,228,211 B1 | 6/2007 | Lowrey et al. | |
| 7,257,426 B1 | 8/2007 | Witkowski et al. | |
| 7,346,374 B2 | 3/2008 | Witkowski et al. | |
| 7,349,722 B2 | 3/2008 | Witkowski et al. | |
| 7,516,072 B2 | 4/2009 | Campbell et al. | |
| 7,564,377 B2 * | 7/2009 | Kimchi et al. | 340/995.13 |
| 7,689,253 B2 | 3/2010 | Basir | |
| 7,787,907 B2 | 8/2010 | Zeinstra et al. | |
| 8,064,575 B1 | 11/2011 | Dhanoa et al. | |
| 8,103,445 B2 * | 1/2012 | Smith et al. | 701/425 |
| 8,161,116 B2 | 4/2012 | Chaddha et al. | |
| 8,413,038 B2 | 4/2013 | Lim et al. | |
| 8,447,598 B2 | 5/2013 | Chutorash et al. | |
| 2001/0033225 A1 | 10/2001 | Razavi et al. | |
| 2001/0056470 A1 | 12/2001 | Ishitani | |
| 2002/0032510 A1 * | 3/2002 | Turnbull et al. | 701/49 |
| 2002/0040271 A1 * | 4/2002 | Park et al. | 701/209 |
| 2002/0054159 A1 | 5/2002 | Obradovich | |
| 2002/0123325 A1 | 9/2002 | Cooper | |
| 2003/0079035 A1 | 4/2003 | Boyd et al. | |
| 2003/0096593 A1 | 5/2003 | Naboulsi | |
| 2003/0114202 A1 | 6/2003 | Suh et al. | |
| 2003/0156097 A1 | 8/2003 | Kakihara et al. | |
| 2003/0179871 A1 | 9/2003 | Ito et al. | |
| 2003/0210796 A1 | 11/2003 | McCarty et al. | |
| 2003/0236818 A1 | 12/2003 | Bruner et al. | |
| 2004/0054468 A1 | 3/2004 | Yamada et al. | |
| 2004/0073356 A1 * | 4/2004 | Craine | G08G 1/096716 701/117 |
| 2004/0073361 A1 * | 4/2004 | Tzamaloukas | G01C 21/3691 701/414 |
| 2004/0104842 A1 * | 6/2004 | Drury | G01C 21/34 342/357.31 |
| 2004/0198389 A1 * | 10/2004 | Alcock | H04M 3/42229 455/456.1 |
| 2004/0203919 A1 * | 10/2004 | Ross | H04L 67/18 455/456.1 |
| 2004/0242216 A1 | 12/2004 | Boutsikakis | |
| 2005/0005298 A1 | 1/2005 | Tranchina | |
| 2005/0014531 A1 | 1/2005 | Findikli | |
| 2005/0015197 A1 | 1/2005 | Ohtsuji et al. | |
| 2005/0024264 A1 * | 2/2005 | Harrison | 342/357.13 |
| 2005/0053008 A1 | 3/2005 | Griesing et al. | |
| 2005/0165513 A1 * | 7/2005 | Obradovich | B60G 17/0195 701/1 |
| 2005/0197747 A1 | 9/2005 | Rappaport et al. | |
| 2005/0197767 A1 * | 9/2005 | Nortrup | G01C 21/3667 701/420 |
| 2005/0208968 A1 | 9/2005 | Codeville | |
| 2005/0210507 A1 | 9/2005 | Hawkins et al. | |
| 2005/0239434 A1 | 10/2005 | Marlowe | |
| 2005/0242970 A1 | 11/2005 | Blaker et al. | |
| 2005/0245272 A1 | 11/2005 | Spaur et al. | |
| 2006/0017612 A1 | 1/2006 | Nagatani | |
| 2006/0129636 A1 | 6/2006 | Matsuura et al. | |
| 2006/0135064 A1 | 6/2006 | Cho et al. | |
| 2006/0136122 A1 * | 6/2006 | Fraser | G01C 21/34 701/533 |
| 2006/0158344 A1 | 7/2006 | Bambini et al. | |
| 2006/0214813 A1 | 9/2006 | Witkowski et al. | |
| 2006/0232376 A1 | 10/2006 | Blaker | |
| 2006/0232377 A1 | 10/2006 | Witkowski | |
| 2007/0054702 A1 | 3/2007 | Rokusek et al. | |
| 2007/0057810 A1 | 3/2007 | Bos et al. | |
| 2007/0123191 A1 | 5/2007 | Simpson | |
| 2007/0132635 A1 | 6/2007 | Dockemeyer et al. | |
| 2007/0143798 A1 | 6/2007 | Jira et al. | |
| 2007/0152798 A1 | 7/2007 | Witkowski | |
| 2007/0197172 A1 | 8/2007 | Witkowski et al. | |
| 2007/0210905 A1 | 9/2007 | Battista | |
| 2007/0213092 A1 | 9/2007 | Geelen | |
| 2007/0225898 A1 * | 9/2007 | Pfleging et al. | 701/201 |
| 2007/0252689 A1 * | 11/2007 | Rothschild | 340/539.13 |
| 2008/0027643 A1 | 1/2008 | Basir et al. | |
| 2008/0068205 A1 | 3/2008 | Witkowski | |
| 2008/0188180 A1 * | 8/2008 | Rahja | 455/41.2 |
| 2008/0192659 A1 | 8/2008 | Santavicca | |
| 2008/0215524 A1 * | 9/2008 | Fuchs | G06F 17/30241 |
| 2008/0221742 A1 | 9/2008 | DiCroce | |
| 2008/0244050 A1 | 10/2008 | Wong et al. | |
| 2009/0085728 A1 | 4/2009 | Catten et al. | |
| 2010/0100310 A1 * | 4/2010 | Eich et al. | 701/201 |
| 2011/0257973 A1 | 10/2011 | Chutorash et al. | |
| 2012/0072096 A1 * | 3/2012 | Chapman | G08G 1/0133 701/118 |
| 2014/0100740 A1 | 4/2014 | Chutorash et al. | |

FOREIGN PATENT DOCUMENTS

| | | |
|---|---|---|
| EP | 1 052 609 B1 | 11/2000 |
| EP | 1 267 111 A1 | 12/2002 |
| EP | 1 304 695 A2 | 4/2003 |
| EP | 1 338 866 A2 | 8/2003 |
| EP | 1 357 358 A1 | 10/2003 |
| EP | 1 387 145 A1 | 2/2004 |
| EP | 1 058 220 B1 | 12/2004 |
| EP | 1 568 834 A1 | 8/2005 |
| EP | 1 655 677 A2 | 5/2006 |
| EP | 1 698 518 A2 | 9/2006 |
| EP | 1 493 994 B1 | 8/2007 |
| EP | 1 959 410 A1 | 8/2008 |

(56) References Cited

FOREIGN PATENT DOCUMENTS

| | | |
|---|---|---|
| EP | 1 560 200 B1 | 11/2008 |
| GB | 2 375 397 B | 5/2004 |
| JP | 01-290032 | 11/1989 |
| JP | 2001-282691 A | 10/2001 |
| JP | 2001-297527 A | 10/2001 |
| JP | 2001-304875 A | 10/2001 |
| JP | 2001-325221 A | 11/2001 |
| JP | 2002-027386 | 1/2002 |
| JP | 2002-087183 A | 3/2002 |
| JP | 2002-169584 A | 6/2002 |
| JP | 2002-171217 A | 6/2002 |
| JP | 2003-150505 A | 5/2003 |
| JP | 2003-244343 A | 8/2003 |
| JP | 2003-304339 A | 10/2003 |
| JP | 2003-330856 | 11/2003 |
| JP | 2004-153660 A | 5/2004 |
| JP | 2005-236560 A | 9/2005 |
| JP | 2005-284886 A | 10/2005 |
| JP | 2006-033377 | 2/2006 |
| JP | 2006-319727 A | 11/2006 |
| JP | 2006-321470 A | 11/2006 |
| JP | 2006-349405 A | 12/2006 |
| JP | 2007-256137 | 10/2007 |
| WO | WO-00/75905 A1 | 12/2000 |
| WO | WO-01/67413 | 9/2001 |
| WO | WO-2004/043750 A2 | 5/2004 |
| WO | WO-2004/077729 A2 | 9/2004 |
| WO | WO-2005/002080 A1 | 1/2005 |
| WO | WO 2006/063602 A1 | 6/2006 |
| WO | WO 2007/123798 A1 | 11/2007 |
| WO | WO-2008/079811 A1 | 7/2008 |
| WO | WO 2008/079889 A2 | 7/2008 |
| WO | WO 2008/079891 A2 | 7/2008 |
| WO | WO 2008/091727 A1 | 7/2008 |
| WO | WO 2009/073806 A2 | 6/2009 |

OTHER PUBLICATIONS

Office Action for European Patent Application No. 07 869 539.2, dated Jun. 25, 2010, 5 pages.
International Search Report and Written Opinion for International Application No. PCT/US2007/088171, mailing date Jun. 27, 2008, 11 pages.
Office Action for European Patent Application No. 07869543.4, dated Dec. 22, 2010, 6 pages.
Office Action for European Patent Application No. 07869543.4, dated Oct. 14, 2009, 3 pages.
Office Action for U.S. Appl. No. 12/524,154, dated Oct. 11, 2011, 11 pages.
International Search Report and Written Opinion for International Application No. PCT/US2007/088175, mail date Sep. 19, 2008, 11 pages.
International Search Report and Written Opinion for International Patent Application No. PCT/US2008/085570, mailed Oct. 22, 2009, 17 pages.
International Search Report and Written Opinion for International Patent Appln. No. PCT/US2008/050436, mailed Jun. 18, 2008, 9 pages.
MP3CAR.com, MP3Car.com Wiki, http://www.mp3car.com, believed to be available by at least Jan. 12, 2007, 11 pages.
Dahn, et al., "Combinatorial Study of Sn1-xCox ($0 < x < 0.6$) and [Sn0.55Co0.45]1-yCy ($0 < y < 0.5$) Alloy Negative Electrode Materials for Li-Ion Batteries," Journal of Electrochemical Society, (2006), 153:A361-365.
http://en.wikipedia.org/wiki/Near_Field_Communication, Oct. 17, 2007, 6 pages.
International Search Report and Written Opinion for International Patent Application No. PCT/US2009/065855, dated Jun. 11, 2010.
Invitation to Pay Additional Fees and Communication Relating to the Results of the Partial International Search dated Jun. 12, 2009 as received in PCT/US2008/085570, 6 pages.
Japan Office Action dated May 15, 2012 as received in corresponding Japan Application No. 2009-543188 and its English Translation, 7 pages.
Japan Office Action dated May 15, 2012 as received in corresponding Japan Application No. 2009-547339 and its English Translation.
Office Action for European Application No. 04751431.0, mail date Dec. 14, 2009, 5 pages.
Office Action for U.S. Appl. No. 10/558,121, dated Jan. 20, 2010, 9 pages.
Office Action for U.S. Appl. No. 10/558,121, dated Jul. 9, 2010, 11 pages.
Office Action in JP 2010-537078 dated Oct. 2, 2012.
Office Action in JP Appln No. 2009-543188 dated Nov. 6, 2012.
Office Action in U.S. Appl. No. 13/428,857 dated Oct. 16, 2012.
Office Action in U.S. Appl. No. 12/328,663 dated Apr. 26, 2012.
Office Action in U.S. Appl. No. 13/007,447 dated Aug. 27, 2012.
Office Action received for U.S. Appl. No. 12/328,663, dated Nov. 23, 2011, 13 pages.
Office Action U.S. Appl. No. 10/558,121 dated Apr. 11, 2012.
PCT Invitation to Pay Additional Fees and Partial International Search Report as received in PCT/US2009/065855, dated Mar. 19, 2010.
Written Opinion for International Patent Application No. PCT/US2004/017058, mailed Oct. 15, 2004.
US Notice of Allowance received in connection with U.S. Appl. No. 13/007,447 DTD Jan. 18, 2013.
Non-Final Office Action mailed Jul. 30, 2013, as received in co-pending U.S. Appl. No. 13/428,857.
Final Office Action mailed Mar. 15, 2013, as received in co-pending U.S. Appl. No. 13/428,857.
Notice of Allowance mailed Oct. 8, 2013, as received in co-pending U.S. Appl. No. 12/780,779.
Office Action for Japanese Patent Application No. 2009-543188 dated Jun. 3, 2014.
Examination Report in corresponding European Application No. 08 857 882.8 dated Feb. 26, 2015, 4 pages.
Final Office Action dated Feb. 24, 2015, in U.S. Appl. No. 12/524,154.
Final Office Action issued in U.S. Appl. No. 13/899,418 dated Oct. 9, 2015.
Non-Final Office Action issued in U.S. Appl. No. 12/524,154 dated Sep. 22, 2015.
EP Communication or European Application No. 08 857 882 dated Sep. 13, 2013.
Final Notice of Reasons for Rejection mailed Oct. 29, 2013, as received in corresponding Japanese Patent Application No. 2010-537078, with English language translation of the same.
Non-Final Office Action issued in U.S. Appl. No. 13/899,418 dated Mar. 26, 2015.
Office Action for Japanese Application No. 2013-160381 dated Jun. 10, 2014.
Office Action for Japanese Patent Application No. 2009-543188 dated Oct. 29, 2013.
Notice of Allowance dated Apr. 18, 2016, in U.S. Appl. No. 12/524,154.
Office Action dated Mar. 10, 2016, in U.S. Appl. No. 13/899,418.

* cited by examiner

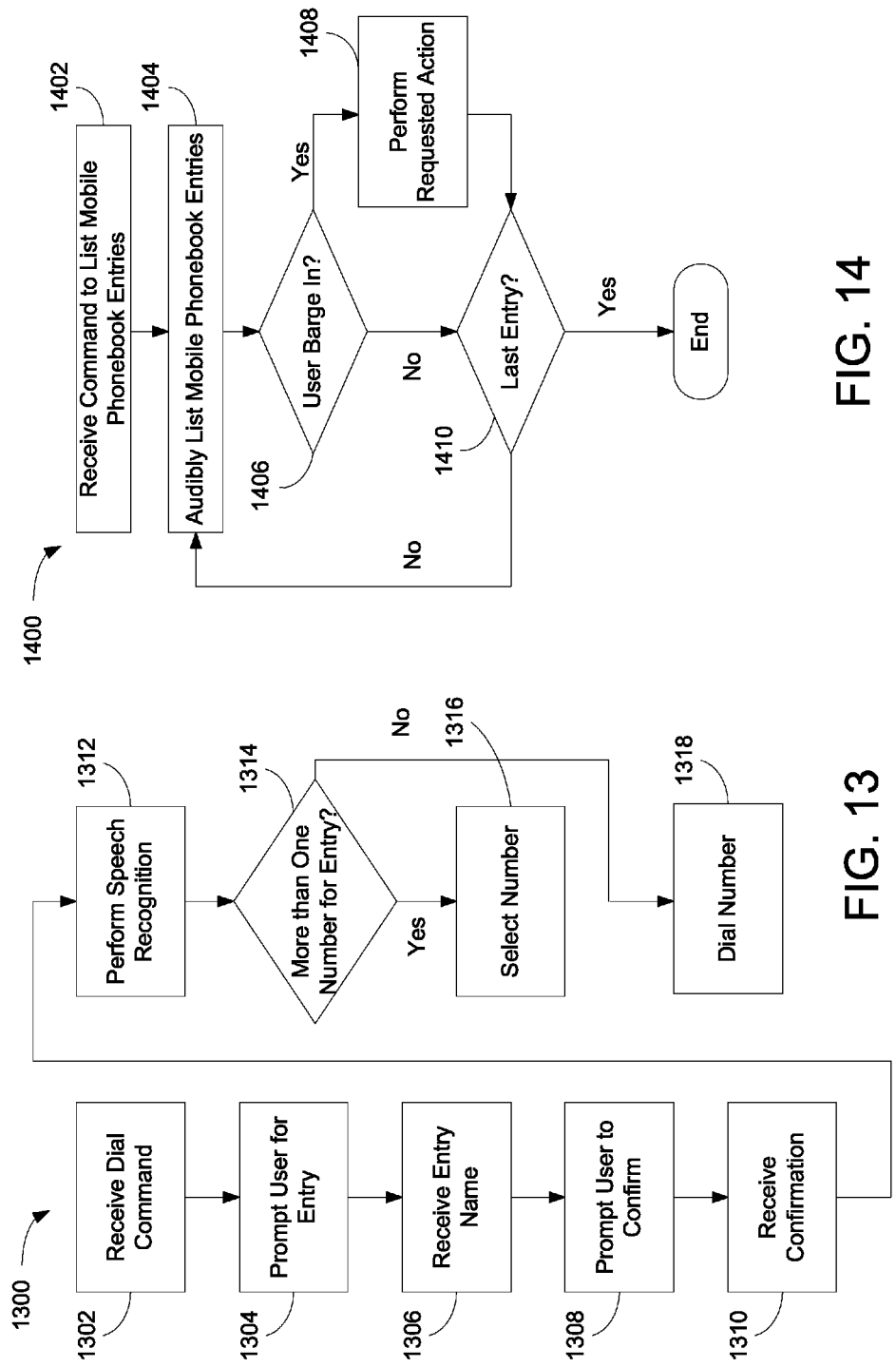

SYSTEM AND METHOD FOR PROVIDING ROUTE CALCULATION AND INFORMATION TO A VEHICLE

CROSS-REFERENCE TO RELATED PATENT APPLICATIONS

The present application claims the benefit of International Application No. PCT/US2007/088171 filed Dec. 19, 2007, which claims the benefit of U.S. Provisional Patent Application No. 60/875,828 filed Dec. 20, 2006, U.S. Provisional Patent Application No. 60/876,092 filed Dec. 20, 2006, U.S. Provisional Patent Application No. 60/876,281 filed Dec. 21, 2006 and U.S. Provisional Patent Application No. 60/889,212 filed Feb. 9, 2007, the entire disclosures of which are incorporated by reference herein.

BACKGROUND

The present invention relates generally to the field of communication, navigation, and user control in a motor vehicle. The invention relates more specifically to systems and methods for providing route information to a vehicle system.

Vehicles typically include a number of electronics systems and subsystems such as an audio system, a mobile telephone system, a navigation system, an in-vehicle entertainment system, an engine management system that may be controlled by a user interface, an HVAC system, etc. One or more of these systems may include or be provided by an in-vehicle control system that may be setup in the vehicle. The control system may include a control interface and accompanying controls and may be configured to be coupled or integrated with other vehicle electronic systems, such as a display system or an audio system.

An increasing number of vehicles are being sold with embedded or installed global position system (GPS) navigation systems, which typically include a GPS receiver configured to receive position information (e.g., latitude, longitude, altitude, etc.), a database containing map and/or navigation data, such as, for example, both roadway data and point-of-interest (POI) data, and a dedicated display screen. It should be appreciated that the roadway data and/or POI data can include not only information about a given point of interest (e.g., name, location, address, phone number, etc.) but also street and or roadway data that is related to a location along a specific roadway (e.g., speed limit information, number of lanes, warning information, etc.). The database associated with a vehicle navigation system is typically implemented as a CD-ROM or DVD-ROM disk and disk player. Besides the cost of these GPS navigation systems, one drawback is the static nature of the map and/or navigation data, or more specifically, the static nature of the storage medium for the roadway and POI data. Roadway and POI data can be dynamic, for example, as roads are created, widened or closed, speed limits adjusted, and restaurants, fuel stations, hotels, and other points of interest are opened, closed, and/or renamed. Because the map and/or navigation data is typically stored on an optical disk, the map and/or navigation data starts becoming out of date as soon as the disk is made. The older the disk, the more out of data the map and/or navigation data becomes. Due to the cost and inconvenience of getting new map data disks, users typically do not regularly get new map and/or navigation data disks, if they get them at all.

There is a need for an in-vehicle control system capable of requesting information from remote sources. Further, there is a need for an in-vehicle control system capable of displaying real-time, live, or frequently updating images from a remote source. Further, there is a need for processing relating to information for display on audio systems and/or playback on video systems to be conducted off-board or at a source remote from the vehicle.

It would be desirable to provide a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY

Once embodiment relates to a system for mounting in a vehicle and for providing route information calculated by a remote source to a display. The system includes a display interface for providing a signal to the display. The system further includes a communications device. The system yet further includes a processor operatively coupled to the communications device and the display interface, wherein the processor is configured to cause vehicle position information to be sent to the remote source via the communications device. The processor is further configured to receive route information from the remote source via the communications device. The processor is yet further configured to provide a representation of the route information to the display interface, the route information conveying directions from a position of the vehicle to a destination.

Another embodiment relates to a method for providing a representation of directions from a remote source to display interface for providing a signal to a display system mounted in a vehicle, the directions being directions from a vehicle position to a destination. The method includes formatting a request, the request for transmission via a communications device, wherein the request is a request for directions from a vehicle position to a destination. The method further includes retrieving vehicle position information from a device for determining position. The method yet further includes providing the request and vehicle position information to the communications device for forwarding to the remote source. The method further includes receiving the directions from the remote source via the communications device. The method further includes generating a map image, the map image including a representation of the directions and providing the map image including the representation of the directions to the display interface.

The invention is capable of other embodiments and of being practiced or being carried out in various ways. Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which:

FIG. 13 is a flow diagram of a process of receiving a request from a user to access a phonebook entry using speech recognition of the vehicle control system, according to an exemplary embodiment; and FIG. 14 is a flow diagram of a process of listing phonebook entries to a user, according to an exemplary embodiment.

DETAILED DESCRIPTION OF THE EXEMPLARY EMBODIMENTS

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
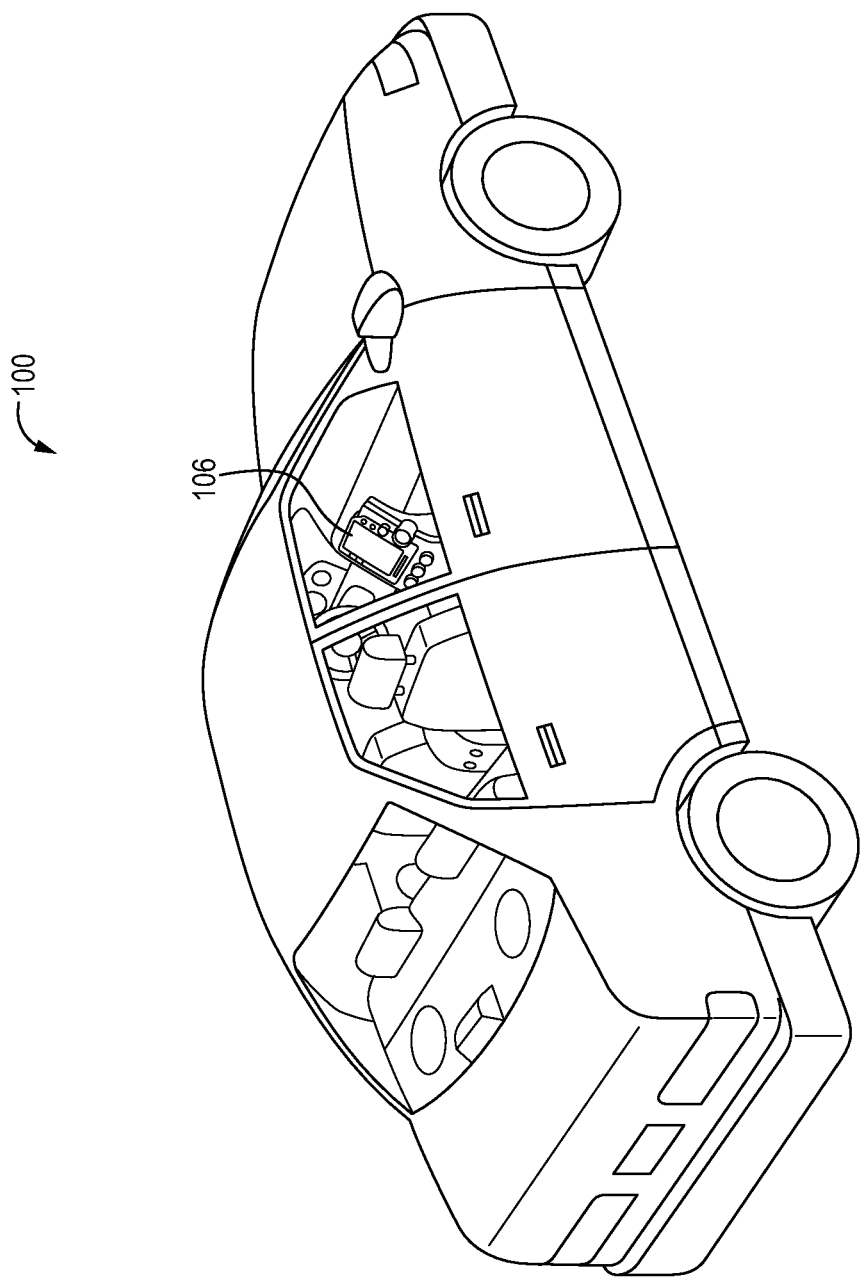
FIG. 1 is a perspective view of a motor vehicle that includes a number of vehicle systems, including an in-vehicle control system, according to one exemplary embodiment.

Referring to FIG. 1, a vehicle 100 includes a number of subsystems for user convenience and entertainment. Vehicle 100 generally includes a heating, ventilation, and air-conditioning (HVAC) system, a sound system, and an in-vehicle control system 106 (e.g., media system, navigational system, entertainment system, display system, communications systems, etc.). The HVAC system, sound system, display systems, and communications systems may be coupled to in-vehicle control system 106, which is capable of controlling and monitoring a variety of systems, automatically or by a manual user command. It is noted that in various exemplary embodiments, vehicle 100, the HVAC system, the sound system, and other vehicle systems may be of any past, present, or future design capable of interacting with in-vehicle control system 106.

Figure 2:
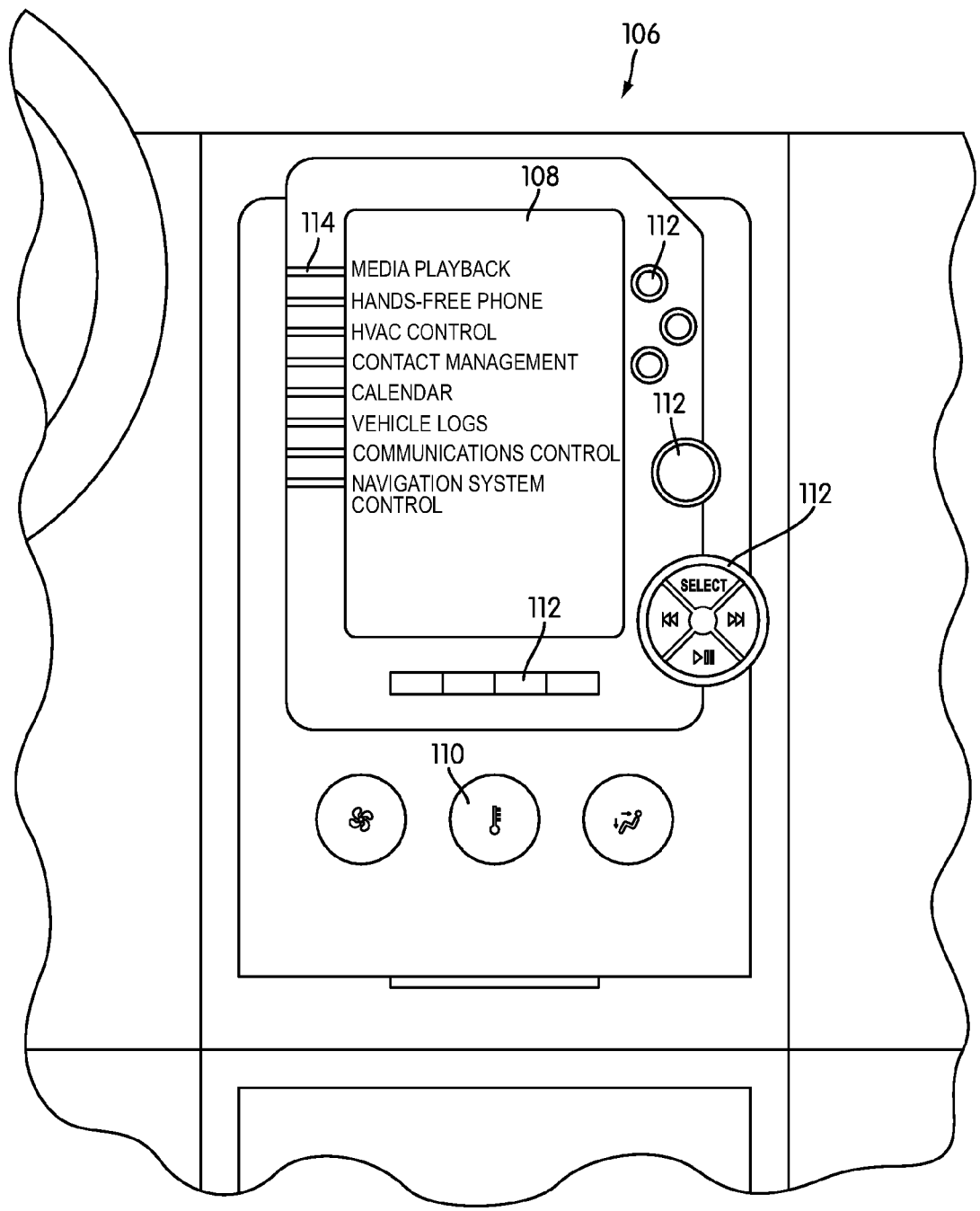
FIG. 2 is a front elevation view of the user interface of the in-vehicle control system of FIG. 1, according to an exemplary embodiment.

Referring to FIG. 2, one exemplary embodiment of in-vehicle control system 106 is shown. In-vehicle control system 106 generally includes an output display 108, one or more knobs 110, one or more pushbuttons 112, and one or more tactile user inputs or pushbuttons 114, which facilitate controlling various vehicle and media functions. In one exemplary embodiment, output display 108 may be a touch-screen display, while in other exemplary embodiments, may be any other non-touch sensitive display. In still other exemplary embodiments, output display 108 may be of any technology (e.g., LCD, DLP, plasma, CRT), configuration (e.g., portrait or landscape), or shape (e.g., polygonal, curved, curvilinear). Output display 108 may be a manufacturer installed output display, an aftermarket output display, or an output display from any source. Output display 108 may be an embedded display (e.g., a display embedded in the control system or other vehicle systems, parts or structures), a standalone display (e.g., a portable display, a display mounted on a movable arm), or a display having any other configuration. Output Knobs 110 and pushbuttons 112 and 114 may be configured: (i) to control functions of the HVAC system such as fan speed, cabin temperature, or routing of air flow, (ii) to control playback of media files over the sound system, (iii) to control retrieval of phonebook entries, (iv) to control any other desired vehicle function, or to (v) control a function of a connected remote source. Pushbuttons 114 typically allow for the selection and display of various functions of in-vehicle control system 106 including HVAC system control, sound system control, media system control, display system control, communications system control, hands-free phone use, contract or address/phone book management, calendar viewing/modification, and vehicle data logging. Pushbuttons 114 may also allow for viewing and reconfiguration of navigation system settings, device profiles, and/or command and control mapping.

The operation of pushbutton 114 for media playback may display a media playback menu screen or execute commands that allow the user to view, select, sort, search for, and/or play audio or video files by tactile or oral command. The operation of pushbutton 114 for hands-free phone operation may display a menu screen or execute commands that allow the user to connect in-vehicle control system 106 to a mobile phone so that speaking into the vehicle console of in-vehicle control system 106 operates the mobile phone. The operation of pushbutton 114 for HVAC control may display a menu screen or execute commands that allow the user to control cabin temperature and air flow by tactile or oral command. The operation of pushbutton 114 for contact management may display a menu screen or execute commands that allow the user to view, list, select, sort, search for, edit, and/or dial one or more entries containing personal contact information, by use of a tactile or oral command. The operation of pushbutton 114 for calendar management may display a menu screen or execute commands that allow the user to view, list, select, sort, search for, edit, and/or create one or more entries containing personal schedule information by tactile or oral command. The operation of pushbutton 114 for vehicle log management may display a menu screen or execute commands that allow the user to input, view, select and/or reset information related to the vehicle operation (e.g., fuel economy, engine temperature, distance to empty, etc.) by tactile or oral command. The operation of pushbuttons 114 for communications control may display a menu screen or execute commands that allow the user to input, view, select, reset, set, or activate communications settings or communications modes by tactile or oral command. The operation of pushbuttons 114 for navigation system control may display a menu screen or execute commands that allow the user to input, view, set, select, and/or change navigation settings.

Figure 3:
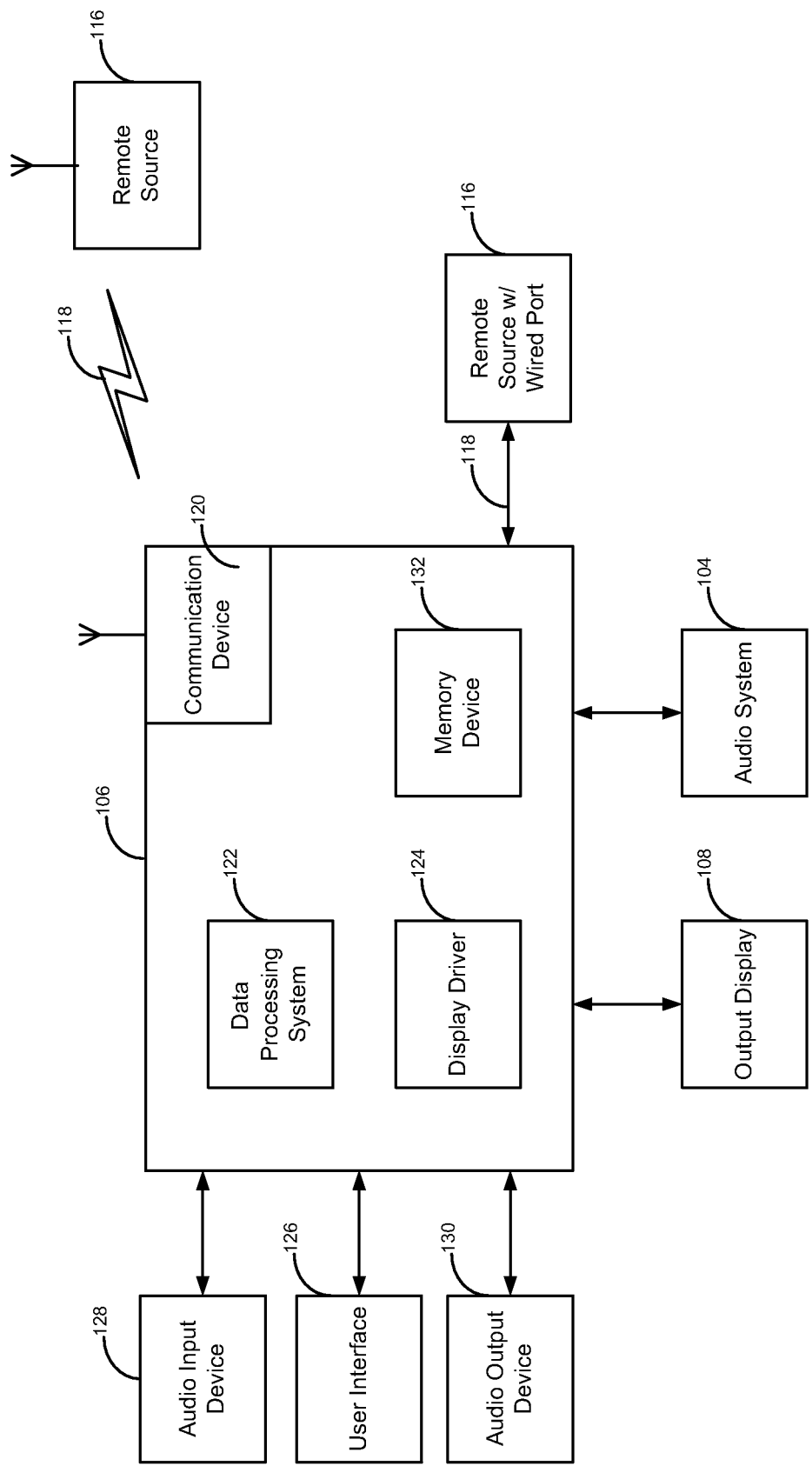
FIG. 3 is a block diagram of the in-vehicle control system of FIG. 1, according to an exemplary embodiment.

Referring to FIG. 3, in-vehicle control system 106 is capable of accessing data files from a remote source 116 over a communication link 118. For example, in-vehicle control system 106 may access media files, phonebook data files, calendar data, image data, or any other accessible data for use by in-vehicle control and media system. In-vehicle control system 106 may also send requests, receive files, send and receive commands, and send and/or receive any other type of data to and/or from a remote source 116 over a communications link 118.

In-vehicle control system 106 generally includes a communication device 120, a data processing system 122, a display driver 124, a user interface 126, an audio input device 128, an audio output device 130, an output display 108, and a memory device 132.

Communication device 120 is generally configured to establish communication link 118 with remote source 116. In one exemplary embodiment, in-vehicle control system 106 may establish a wireless communication link such as with Bluetooth communications protocol, an IEEE 802.11 protocol, an IEEE 802.16 protocol, a cellular signal, a Shared Wireless Access Protocol-Cord Access (SWAP-CA) protocol, a wireless USB protocol, or any other suitable wireless technology. In another exemplary embodiment, in-vehicle control system 106 may establish a wired communication link such as with USB technology, IEEE 1394 technology, optical technology, other serial or parallel port technology, or any other suitable wired link. Communication device 120 may receive one or more data files from remote source 116. In various exemplary embodiments, the data files may include text, numeric data, audio, video, program data, command data, information data, coordinate data, image data, streaming media, or any combination thereof.

Data processing system 122 is coupled to communications device 120 and is generally configured to control each function of in-vehicle control system 106. Data processing system 122 may facilitates speech recognition capabilities of in-vehicle control system 106 for the convenience of the user. Data processing system 122 may include digital or analog processing components and/or be of any past, present, or future design that facilitates control or features of in-vehicle control system 106. Data processing system 122 may be a single data processing device or multiple data processing devices. Data processing system 122 may be a data processing device having data processing sub-devices or components. Data processing system 122 may include any combination of program software and hardware capable of providing control, display, communications, input and output features to the vehicle. Data processing system 122 may coordinate the various devices, components and features of the in-vehicle control system (e.g., communications device 120, output display 108, display driver 124, memory device 132, audio system 104, user interface 126, audio input device 128, audio output device 130, etc).

Display driver 124 is coupled to output display 108 and is typically configured to provide an electronic signal to the output display. In one exemplary embodiment, the electronic signal may include the text and/or numeric data of the data files, while in other exemplary embodiments, any other desired data may be included with the text and/or numeric data or by itself in the electronic signal to the output display.

In another exemplary embodiment, display driver 124 may be configured to control output display 108 with touch-screen capabilities, while in other exemplary embodiments, display driver 124 may be configured to control display 108 without making use of touch-screen capabilities. Display driver 124 may include any number of functions, software or hardware, to facilitate the control and display of images on display 108. In still other exemplary embodiments, display driver 124 may be of any past, present, or future design that allows for the control of output display 108.

Audio input device 128, for example a microphone, is configured to receive the utterance of a user for transmission to data processing system 122 for speech recognition so that the functions of in-vehicle control system 106 may be operated by voice command. Audio output device 130, for example a built-in speaker, is configured to provide the user with an audio prompt of various functions, such as user selection confirmation.

Memory device 132 is configured to store data accessed by in-vehicle control system 106. For example, memory device 132 may store data input by remote source 116, data created by data processing system 122 that may be used later, intermediate data of use in current calculation or process, or any other data of use by in-vehicle control system 106.

Figure 4:
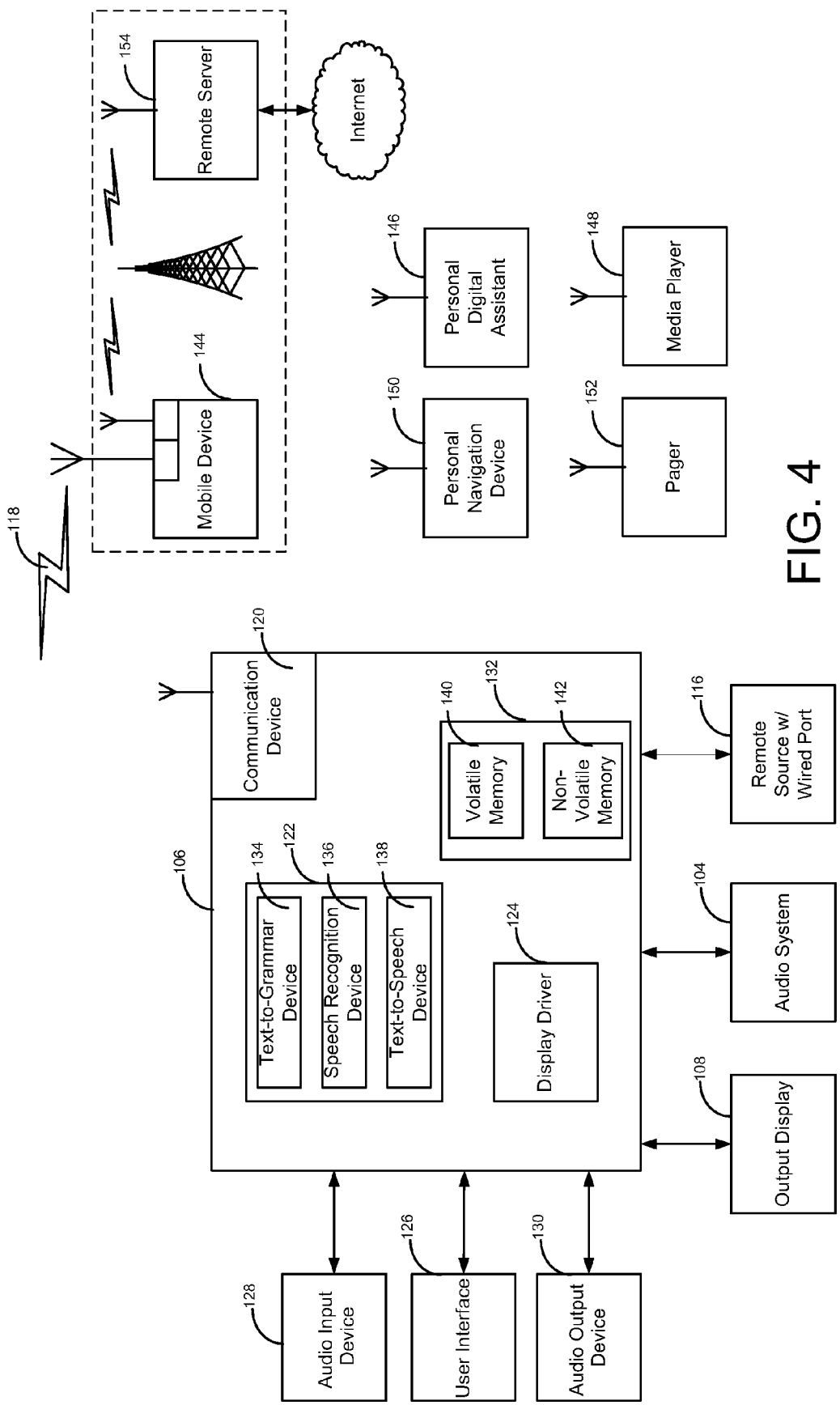
FIG. 4 is a more detailed embodiment and block diagram of the in-vehicle control system of FIG. 3, according to one exemplary embodiment.

Referring to FIG. 4, in-vehicle control system 106 and remote source 116 are shown in greater detail. Data processing system 122 may generally include a text-to-grammar device 134, a speech recognition device 136, and a text-to-speech device 138. Data processing system 122 may include any number of additional hardware modules, software modules, or processing devices (e.g., additional graphics processors, communications processors, etc.).

Text-to-grammar device 134 may be coupled to communications device 120 and is generally configured to generate a phonemic representation of the text and/or numeric data of each of the data files received by communications device 120 from remote source 116. The phonetic representation of the text and/or numeric data of each data file may be configured to facilitate speech recognition of each data file. After conversion of a data file to a phonetic representation, the data file may be accessed via an oral input command received by speech recognition device 136 via audio input device 128. According to an exemplary embodiment, text-to-grammar device 134 may be able to provide phonemic representations of information received from a remote source.

Speech recognition device 136 is typically configured to receive an oral input command from a user via audio input device 128. Speech recognition device compares the received oral input command to a set of predetermined input commands, which may have been configured by text-to-grammar device 134. In various exemplary embodiments, the input commands may be related to the playback of a media file, the dialing or input of a phone book entry, the entry or listing of calendar or contact data, the control of the HVAC system, or any other desired function to be performed on data. Speech recognition device 136 may determine an appropriate response to the oral input command received from the user, for example, whether the oral input command is a valid or invalid instruction, what command to execute, or any other appropriate response. According to an exemplary embodiment, speech recognition device 136 may be able to trigger or activate a display reproduction mode when certain commands are recognized. Furthermore, speech recognition device 136 may be able to pass commands to a remote device 116 to facilitate interactive control of a remote source via a communications link.

Text-to-speech device 138 is generally configured to convert the text and/or numeric data of each data file received from remote source 116 into an audible speech representation. This functionality may allow in-vehicle control system 106 to audibly give data to the user via audio output device 130 or the audio system 104. For example, in-vehicle control system 106 may repeat a user selected function back to the user, provide navigational information, announce directions, announce menu options, announce media file information, provide phonebook or contact information, or other information related to data stored in memory 132, remote source 116, remote server 154, etc. According to an exemplary embodiment, text-to-speech device 138 may be able to provide an audible speech representation of information received from a remote source.

Memory device 132 includes both a volatile memory 140 and a non-volatile memory 142. Volatile memory 140 may be configured so that the contents stored therein may be erased during each power cycle of the control system 106 or the vehicle 100. Non-volatile memory 142 may be configured so that the contents stored therein may be retained across power cycles, such that upon control system 106 power-up, data from previous system use remains available for the user. According to an exemplary embodiment non-volatile memory 142 may store one or more user profiles, display profiles, communications profiles, navigation profiles, or any other type of user or system setting file.

According to an exemplary embodiment, remote source 116 may be any suitable remote source that includes a transceiver and is able to interface with in-vehicle control system 106 over communications link 118 (either wireless or wired). In various exemplary embodiments, remote source 116 may be one or more of a mobile phone 144, a personal digital assistant (PDA) 146, a media player 148, a personal navigation device (PND) 150, a pager 152, a remote server 154 that may be coupled to the Internet, or various other remote sources. Remote source 116 may have a storage device, one or more processing devices, and one or more communications devices. According to an exemplary embodiment, remote source 116 is a global positioning system capable remote source. According to various exemplary embodiments, remote source 116 may connect to the Internet or any other remote source with a first communications device while communicating with the control system using a second communications device.

Figure 5:
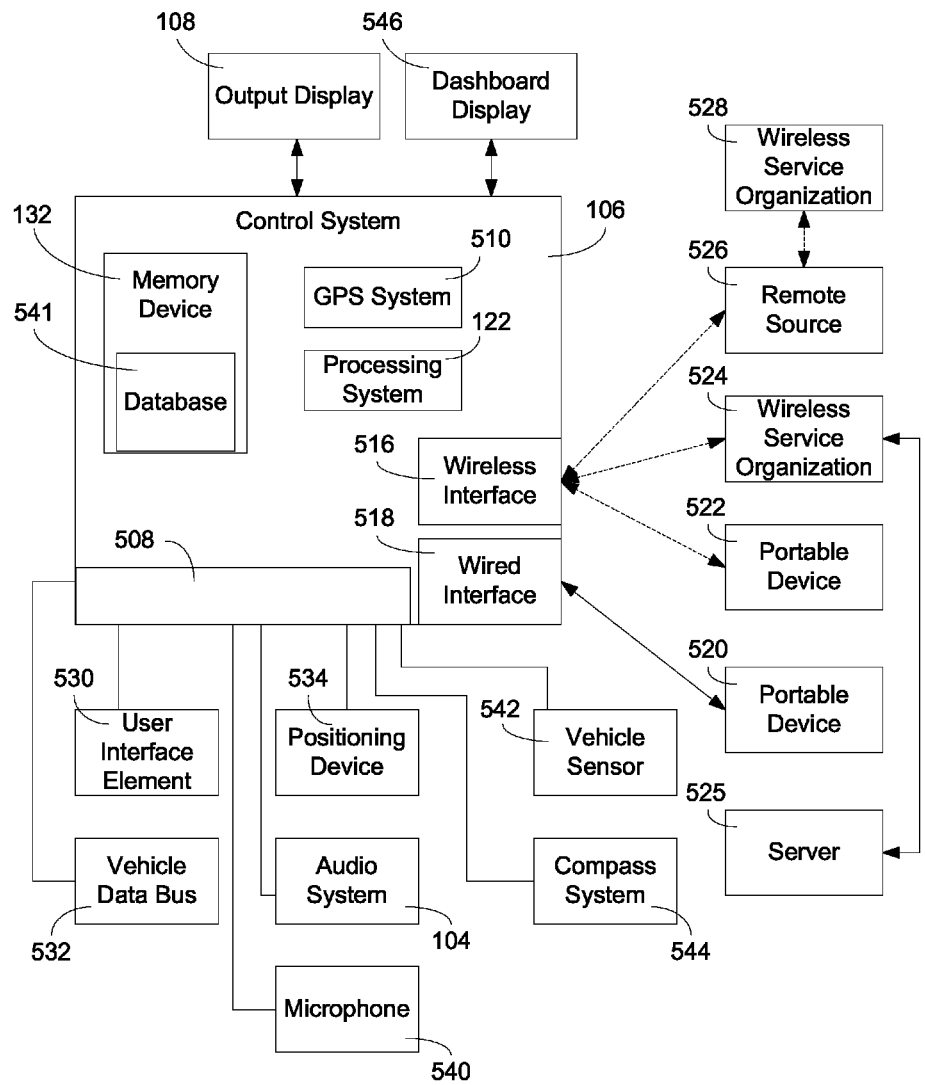
FIG. 5 is a block diagram of the control system of FIG. 1, according to another exemplary embodiment.

Referring to FIG. 5, control system 106 is shown, according to various exemplary embodiments. FIG. 5 illustrates a variety of connectivity possibilities for control system 106. In particular, control system 106 is shown to include a wireless interface 516 and a wired interface 518. Wireless interface 516 may be used to communicably couple control system 106 to a portable device 522, a wireless service organization 524 (and/or a server 525), a remote source 526 and/or a wireless service organization 528. Wired interface 518 may be used to communicably couple control system 106 to portable device 520. It is important to note that any of devices 520, 522, 524, 526, and 528 may be configured for coupling to further organizations, devices, or servers. For example, wireless service organization 524 is shown connected to server 525. By way of further example, remote source 526 is shown connected to wireless service organization 528. Wireless interface 516 may be or include communication device 120 and/or include any number of radio frequency (RF) circuits, modulators, demodulators, filters, transmitters, receivers, transceivers, or the like for completing suitable data communication activities. Wireless interface 516 preferably includes a transceiver that can send and receive voice, audio and/or video data to and from remote sources via a wireless protocol such as CDMA, GSM, 3G, WiFi, WiMax, Bluetooth, ZigBee, any IEEE 802.11 protocol, etc. It is important to note that a connected remote source may be connected to wireless interface 516 and control system 106 via the Internet, a WAN, a LAN, an intermediate service provider, or other intermediate network or source. Wired interface 518, according to an exemplary embodiment, is a universal serial bus (USB) interface. Wired interface 518 may be used to connect portable device 520 to control system 106 and portable device 520 may include communications hardware and/or software for connecting to another remote source (e.g. via a network, wireless service organization, or directly).

Control system 106 is configured to request, receive, or otherwise access information from a remote source, service organization, or server. This activity may take place via a wireless or wired connection. The remote source, service organization, or server may locally store the information or may communicate with a further system to obtain the information for sending to the control system. According to an exemplary embodiment, "remote source" refers to a portable device or a device external the vehicle that is configured to receive a request for information and to respond to the request for information.

Control system 106 is shown to include an interface (or interfaces) 508 for communicably coupling control system to one or more modules or devices. Control system 106 is shown coupled to user interface element 530, vehicle data bus 532, positioning device 534, audio system 104, microphone 540, vehicle sensor 542, and compass system 544. Memory device 132 is shown to include database 541. Control system 106 is also shown to include global positioning satellite system 510. Control system 106 is further shown as coupled to dashboard display 546 and output display 108.

User interface element 530 may provide vehicle occupants with various mechanisms for interacting with system 106 including, for example, a voice recognition feature, an audio prompt feature, a graphical user interface (GUI), a switch, a sensor, a button, a touch screen, a dial, etc.

Vehicle data bus 532 may be a bus, link, or network for sending and/or receiving information in a vehicle. Vehicle subsystems, engine control units, sensor modules, GPS devices, and/or any other systems mounted in a vehicle may be configured to communicate on vehicle data bus 532.

Positioning device 534 is a device configured to provide position information to control system 106. Position information may include latitude coordinates, longitude coordinates, global positioning system coordinates, bearing information, real time location systems information, timing information, altitude information, ranging information, geographic information, and/or any other information that may be used to communicate and/or derive location. Positioning device 534 may include a GPS receiver and/or a compass. Positioning device 534 may also or alternatively include a gyroscope.

Microphone 540 may be a microphone for mounting to a vehicle component, a microphone built into or integral with control system 106, a microphone embedded in a dashboard or visor location, or otherwise. Microphone 540 may generally be configured for receiving voice and for providing an audio signal representative of the voice to control system 106.

Vehicle sensor 542 may be one or more vehicle sensors configured to provide information regarding the vehicle to system 106, according to an exemplary embodiment. Vehicle sensor 542 may be, for example, a wheel speed sensor, a sensor relating to the cruise control system, a sensor coupled to the steering system, or the like.

Compass system 544 is shown coupled to control system 106, according to an exemplary embodiment. Compass system 544 may be any compass system of the past, present, or future configured to provide direction information or bearing information.

GPS system 510 is shown on control system 106, according to an exemplary embodiment. According to other embodiments, a GPS system or receiver is not on or integrally included with control system 106, but is connected to control system 106 via interface 508 or otherwise. GPS system 510 may be any system configured to receive GPS information and to provide the GPS information to control system 106. It should be appreciated that, in such exemplary embodiments, when sufficient GPS signals are unavailable or insufficient (e.g., intermittent signals) to provide position information with some degree of confidence, the heading and speed of the vehicle (e.g., from compass system 544, vehicle sensor 542, and/or positioning device 534) can be used to generate a current position using "dead reckoning" from the last known GPS-based position.

Memory device 132 is shown to include database 541, according to an exemplary embodiment. Database 541 may generally be configured to store information received at interface 508, information received at interfaces 516, 518, information received at GPS system 510, and/or information generated by processing system 122. Database 541 may be configured to store intermediate information or information for transmitting from control system 106 to a remote source. Database 541 preferably stores information that can be used for traveling and/or for providing navigation features to control system 106. For example, database 541 may store navigation system settings, point of interest information, map information, traffic information, weather information, and the like. According to an exemplary embodiment, vehicle control system 106 does not include a persistent on-board static map and/or navigation database; the majority of the data and/or processing for navigation activities are conducted off-board (e.g., at one or more remote sources, servers, or intermediate devices).

According to various exemplary embodiments, an occupant of a vehicle implementing the system of FIG. 5 can access information from a remote source for a variety of uses. For example, an occupant can obtain directions to a particular destination and/or a point of interest. The occupant may make the request through user interface element 530, microphone 540 by using voice recognition, and/or via a touch screen with a graphical user interface. The occupant's request may be provided to interface 508. The request preferably includes information about the desired destination as well as current vehicle information including, for example, information from GPS system 510, information from positioning device 534, vehicle sensor 542, vehicle data bus 532, and/or compass system 544. The request may be processed by processing system 122, stored in memory device 132 and/or database 541. Options and/or other graphical user interface elements for the request may be shown on output display 108 and/or dashboard display 546. The request may be provided to wireless interface 516 and/or wired interface 518 for forwarding to a remote source (e.g., server 525, wireless service organization 528, remote source 526, portable device 522, etc.). According to an exemplary embodiment, the occupant may designate which remote source, service provider, and/or website should receive or "handle" the request. For example, an occupant may specify whether he or she would like to receive directions from Google, Yahoo, Mapquest, or some other map/directions provider.

Information received back from the remote source in response to the request may be stored in memory device 132, database 540, or another storage device connected to control system 106. Once received, processing system 122 may conduct further processing on the information or provide the information to a display system (e.g., display 108, display 546, a head-up display, a head medium display, a seatback display, an overhead console display, etc.). According to an exemplary embodiment, a detailed representation of the information (e.g., a complete map showing a highlighted route, a map showing various points of interest, a map detailing more than one turn, etc.) may be provided on a first display (e.g., a center stack display) and a reduced detail representation of the information (e.g., the next turn, an arrow, a "distance to turn" indicator, a map of reduced area, etc.) may be provided on a second display. Processing system 122 is preferably configured with programming code (e.g., residing on memory device 132 or otherwise) that enables the processing system to process the information received from the remote source and to display the processed information on a display. Processing system 122 may also generate audio prompts, display prompts, rotate the map, and/or update the map with position information provided by subsystems (e.g., GPS system 510, positioning device 534, vehicle sensor 542, etc.).

According to an exemplary embodiment, an icon, graphic and/or trademark relating to a point of interest may be provided to dashboard display 546. Distance information relating to the point of interest may also be provided to dashboard display 546.

According to an exemplary embodiment, as the vehicle continues to change its global position and speed, position information (e.g., via GPS system 510, positioning device 534, vehicle data bus 532, vehicle sensor 542, etc.) can be continuously provided to remote source 526 via wireless interface 516 or wired interface 518. In response, remote source 526 may continually process the position information to provide updated direction information, point-of-interest information, and/or other relevant information. Remote source 526 may also provide commands to control system 106. The commands may be configured to cause, for example, the control system to output a specific element on the display, to output a specific audio prompt, to alert the driver of a condition ahead, or otherwise. For example, remote source 526 may provide real time (or near real time) traffic data and/or command the control system to display or playback a warning relating to traffic conditions. Warnings or advance knowledge of traffic conditions may cause the driver to manually alter their route. According to an exemplary embodiment, if a high traffic, a warning condition, or some other event is learned of by remote source 526 or vehicle control system 106, the system may automatically (or after user confirmation) provide a new set of directions corresponding to a new route of travel. These new directions may be requested by vehicle control system 106 or "pushed" to vehicle control system 106 by remote source 526 having knowledge of the occupant's planned route of travel and/or destination.

Referring now to FIGS. 6A through 6D, block diagrams of various connectivity possibilities for vehicle control system 106 are shown, according to various exemplary embodiments.

Figure 6A:
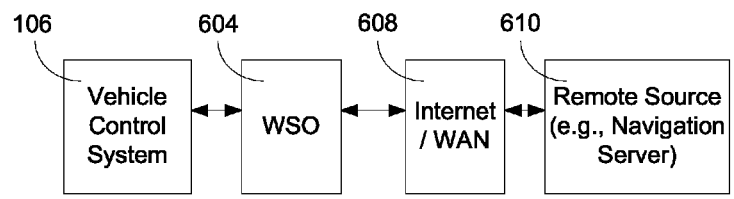
FIGS. 6A through 6D are block diagrams of various connectivity possibilities for the vehicle control system of FIG. 1, according to various exemplary embodiments.

Referring to FIG. 6A, vehicle control system 106 is shown with a connection to wireless service organization (WSO) 604. WSO 604 is shown connected to an network 608 (e.g., Internet, WAN, LAN, etc.). A remote source 610 (e.g., a navigation server, a weather radar server, a point-of-interest server, etc.) is connected to network 608. In this embodiment, vehicle control system 106 may include an embedded (or fixably connected) communications device such as an embedded mobile phone module.

Figure 6B:
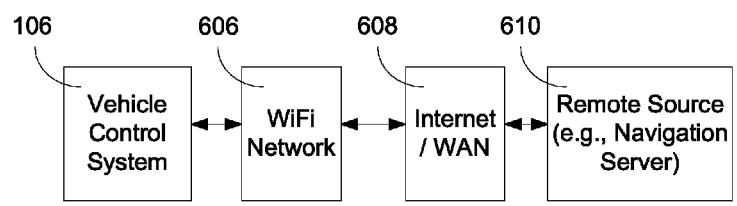

Referring to FIG. 6B, a vehicle control system 106 is shown with a connection to a WiFi network 606. WiFi network 606 is shown connected to an network 608 (e.g., Internet, WAN, LAN, etc.). A remote source 610 (e.g., a navigation server, a weather radar server, a point-of-interest server, etc.) is connected to network 608. In this embodiment, vehicle control system 106 may include an embedded (or fixably connected) communications device such as an embedded WiFi compatible transceiver. According to various exemplary embodiments, a communications device compatible with other wireless local area network technologies may be embedded (or fixably connected) to control system 106. According to yet other exemplary embodiments, a communications device compatible with wireless wide area network technologies (e.g., WiMax) or other long range wireless technologies may be embedded (or fixably connected) to control system 106.

Figure 6C:
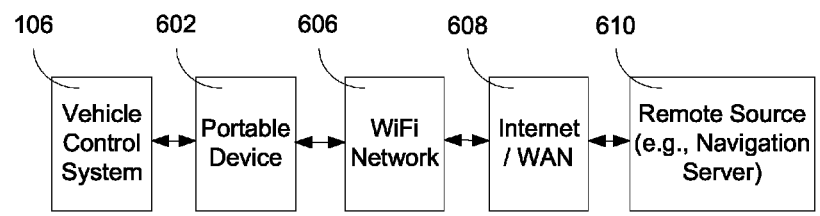
Figure 6D:
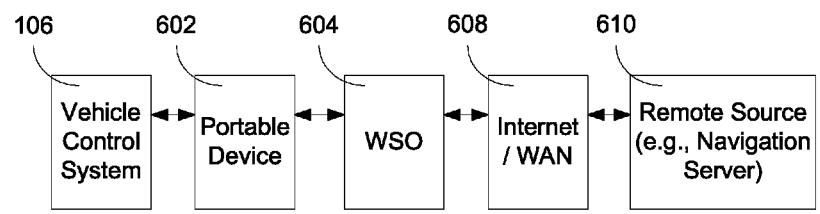

Referring to FIGS. 6C and 6D, vehicle control system 106 is shown connected to portable device 602. Portable device 602 may serve as a bridge to networks 604, 606, 608 and remote source 610. Portable device 602 may include a short range transceiver (e.g., a Bluetooth transceiver, a near field communications transceiver, a WiFi transceiver, a ZigBee transceiver, a wireless USB transceiver, etc.) and a long range transceiver (e.g., a mobile phone transceiver, a WiMax transceiver, etc.) The short range transceiver may be used for communications with a compatible device of vehicle control system 106 and the long range transceiver may be used for communications with network 606 shown in FIG. 6C or wireless service organization (WSO) 604 shown in FIG. 6D. According to various other exemplary embodiments, a mobile phone, PDA, or other device having a transceiver capable of communicating on network 606 or WSO 604 may be connected to vehicle control system 106 via a wired connection (e.g., a USB connection). According to various other exemplary embodiments, any suitable method, structure, protocol, or technology may be used to connect vehicle control system 106 with a remote source 610, wherein remote source 610 is configured to conduct off-board processing and to provide a result of the processing back to vehicle control system 106.

It should be appreciated that, according to various exemplary embodiments, if a control system includes two or more communications possibilities (e.g., the possibilities of FIGS. 6A through 6D), the vehicle control system may be configured to determine the "best" wireless communication link or path to the remote source. Various different factors may be used to determine which device provides the "best" wireless connection. These factors may include, for example, signal strength, direction and/or rate of change in signal strength (because the vehicle could be moving toward or away from the device with the current high signal strength), bandwidth, access cost or any other appropriate factor, as well as any weighted or unweighted combination of these factors. Processing system 122 may conduct the determination based on computer code stored in memory device 132 or another memory device.

Figure 7:
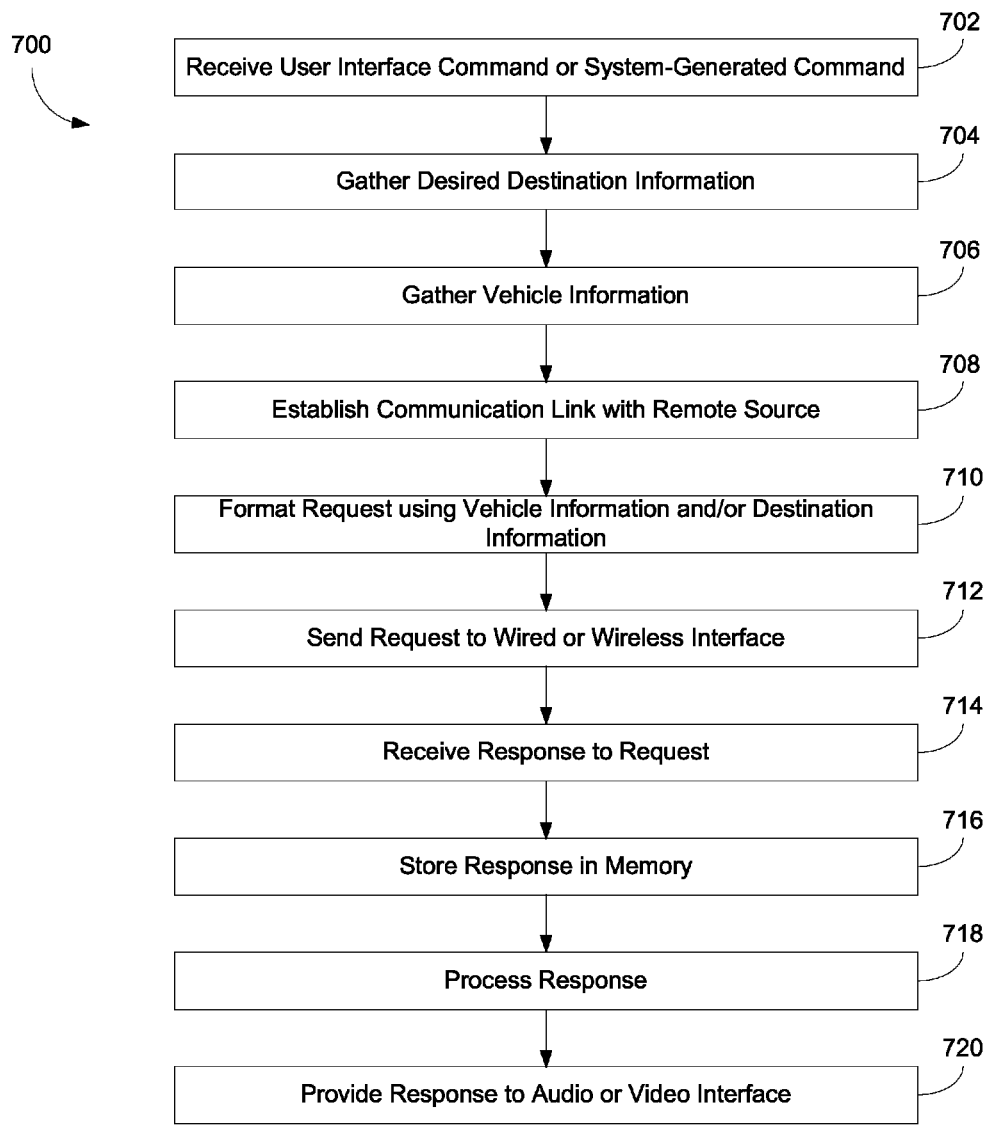
FIG. 7 is a flow diagram of a process for sending a request for off-board processing to a remote source and for providing a response to an audio and/or video interface of the vehicle of FIG. 1, according to an exemplary embodiment.

Referring to FIG. 7, a process 700 is shown for sending a request for off-board processing to a remote source and for providing a response to an audio and/or video interface of the vehicle, according to an exemplary embodiment. Process 700 is shown to include the step of receiving a user interface command or system-generated command (step 702). The user interface command may be generated via a voice recognition system, a tactile user interface element, and/or a touch screen. A system-generated command may also be received (or generated) by the system (e.g., by one or more applications) to initiate an off-board processing task. For example, using GPS information and/or position information available to the vehicle, the system may attempt to determine routes, directions, and/or to update a map display. The system may, however, determine that it is desirable (or necessary) to obtain more information from a remote source. This determination may generate a command to initiate an off-board data gathering process.

The user interface command and/or the system-generated command may prompt the user or otherwise gather (e.g., from a database or another connected source) additional information (e.g., destination information) (step 704). Additional information may include a city, state, zip code, keyword, business name, nickname, alias, category and/or other descriptor. In a system using the off-board process to obtain route or direction information to a destination, the system may prompt for, or the user may provide without prompting, any number of descriptors relating to the desired destination.

Any desired destination information may be supplemented, complemented, or replaced by gathered vehicle information. The control system may be configured to query, receive, access, and/or otherwise gather information (step 706) from one or more GPS systems, position modules, position algorithms, databases, vehicle sensors, engine control units or otherwise. This information may be included with the desired destination information so that the remote source may use the vehicle information and the desired destination information to calculate a route of travel.

At some point during or before process 700, the vehicle control system may be configured to establish a communication link with a remote source (step 708). This step may include establishing a first communication link between the vehicle control system and an intermediate device (e.g., a portable device, a cellular phone, a PDA) and a second communication link between the intermediate device and a remote source (via a network, wireless service organization, or not).

Once information is gathered (e.g., steps 704 and 706) and a communication link with a remote source established (step 708), process 700 is shown to include formatting a request using the vehicle information and/or the destination information (step 710). Any number of processing steps or tasks may take place prior to or during the formatting process. For example, the control system may compress information, encrypt information, compile information, generate further information based on received vehicle information, etc. The formatting may include packaging the information into a file for sending, placing the pieces of the information in a certain order (e.g., bit order), generating a markup document (e.g., an XML document), generating a small database document, generating commands configured to comport with commands known to be expected by the remote source, or the like.

Once formatted, compiled, or otherwise generated, the request may be sent to a wired or wireless interface (step 712). Sending the request may include additional formatting steps, modulating steps, encrypting steps, compressing steps, packaging steps, protocol formatting, packetizing steps, or other processing steps as may be desired by the user and/or expected by any further device or network. Once at the wired or wireless interface, the wired or wireless interface may be configured to send or transmit the request to the remote source (via an intermediate device and/or network or otherwise).

After some amount of time, the control system may receive a response to the request at the wireless interface or the wired interface (step 714). The vehicle control system may be configured to validate the request, authenticate the request, decrypt the request, or to conduct any number of steps so that the information requested may be recognized. The response and/or the information of the response may be stored in memory (step 716) and/or processed (step 718). The response may be provided to an audio interface for playback via an audio system and/or provided to a video interface for display on a display system (step 720). The storing and processing steps (steps 716 and 718) may prepare the response for playback and/or display, add information to the response, generate an image, store the response in a database, parse the response into pieces of information, etc.

Figure 8A:
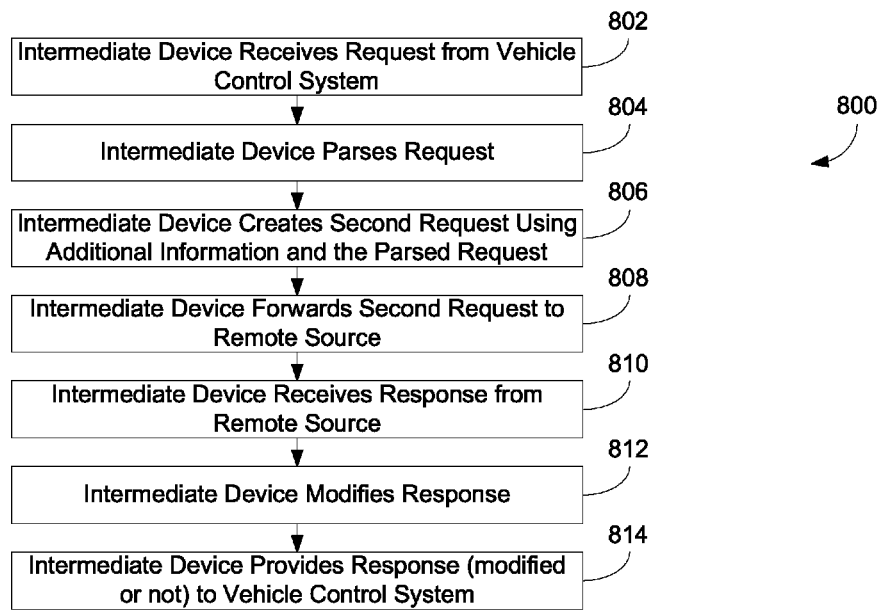
FIG. 8A is a flow diagram of a process that an intermediate device (e.g., a mobile phone) can take with a vehicle control system and a remote source, according to an exemplary embodiment.

Referring now to FIG. 8A, a process 800 that an intermediate device (e.g., a mobile phone) can take with a vehicle control system and a remote source is shown, according to an exemplary embodiment. After the control system sends a request to a wireless or wired interface (e.g., step 712 of FIG. 7), if an intermediate device is used to connect the control system and the remote source, the intermediate device will receive the request from the vehicle control system (step 802). Once received, the intermediate device may parse the request (step 804). The request may only be parsed enough to accurately forward the request on to a suitable network, WSO, and/or remote source, according to various exemplary embodiments. According to other embodiments, however, the intermediate device can add information to the request. The information added to the request by the intermediate device can include a position of the intermediate device (e.g., a mobile phone having a GPS receiver may provide the position of the vehicle, for example, if the vehicle does not have its own GPS receiver or has a less accurate receiver). If the intermediate device is configured to add information to the request and/or to reformat the request in accordance with a wireless protocol used to forward the request to the remote source, the process may include the step of creating a second request using the additional information and the parsed request (step 806). The intermediate device may then be configured to forward the request to the remote source (step 808). The remote source will receive the request, conduct one or more processing tasks on the request, and send a response to the intermediate device. The intermediate device will receive the response from the remote source (step 810). Once the response is received, the intermediate device may forward the response to the vehicle control system with minimal intervention. According to other various exemplary embodiments, the intermediate device may modify the response, reformat the response, and/or add information to the response (step 812). The information added to the response may include image information (e.g., overlay information, directional arrow information, audio information, updated position information based on the intermediate device's GPS receiver, etc.). The intermediate device may then provide the response (whether it has been modified or not) to the vehicle control system (step 814).

Figure 8B:
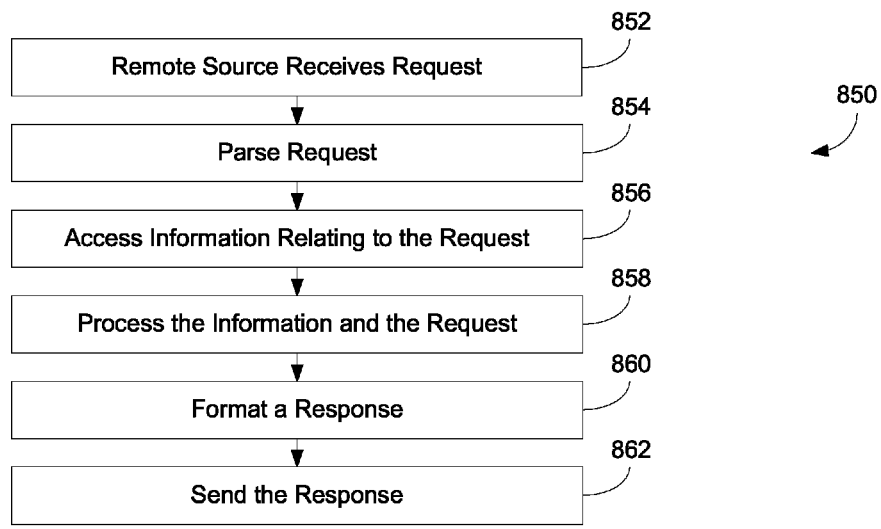
FIG. 8B is a flow diagram of a process for handling requests from a vehicle control system and/or an intermediate device, according to an exemplary embodiment.

Referring now to FIG. 8B, a process 850 is shown for handling requests from a vehicle control system and/or an intermediate device, according to an exemplary embodiment. Process 850 illustrates off-board processing to be executed by a remote source. Whether forwarded directly from the vehicle control system, via a network, and/or via an intermediate device, the remote source is generally configured to receive requests for action (step 852). The request may then be parsed (step 854). Parsing may include any number of demodulating, decrypting, decompressing, or other tasks for recognizing an underlying request. Once the request is recognized by the remote source, information relating to the request may be accessed, retrieved, or requested by the remote source (step 856). Accessing information relating to the request may include querying a database, sending a request to one or more further servers, parsing one or more files, or the like. As or after the information is accessed, the remote source may be configured to process the information and/or the request (step 858). Processing the information and/or the request may include determining that more information is needed and accessing another database, calculating best a best path, considering traffic information, considering weather information, considering vehicle speed information, considering other vehicle information, and/or considering a time of day.

Once the request is processed in step 858, the remote source may be configured to format a response (step 860) for sending back (step 862) to the vehicle control system and/or an intermediate device or network. The formatting and/or sending steps may include any number of modulating, packetizing, compressing, encrypting, formatting for a protocol, or other similar requests.

Figure 9:
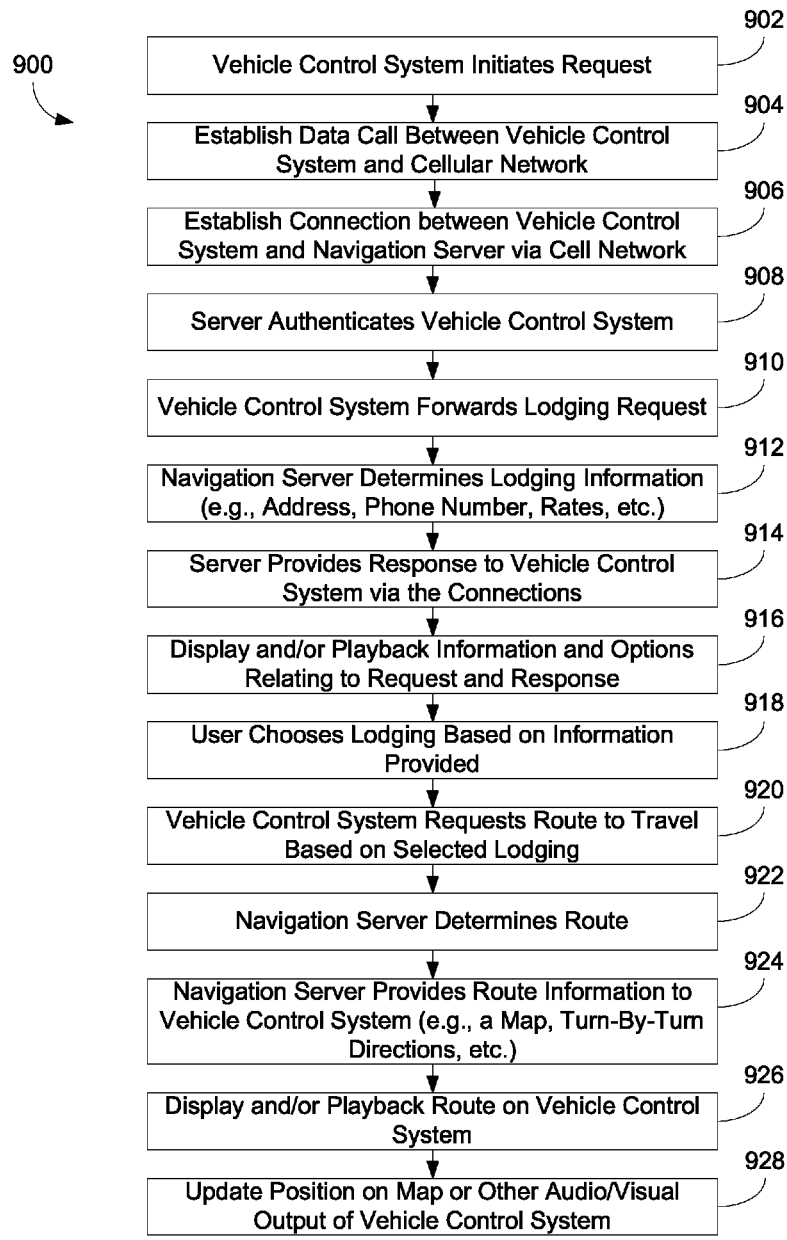
FIG. 9 is a flow diagram of a process for providing navigational information from a remote source to a vehicle control system, according to an exemplary embodiment.

Referring now to FIG. 9, a process 900 for providing navigational information from a remote source to a vehicle control system is shown, according to an exemplary embodiment. Process 900 is shown to include a request being initiating by the vehicle control system (step 902). Process 900 is further shown to include establishing a data call between the vehicle control system and a cellular network (step 904). Once connected to a network or wireless service organization, a connection may then be established between the vehicle control system and a navigation server via the cellular network (step 906). Referring further to process 900, once a connection has been established (or during the activity of establishing the connection) the server may authenticate the vehicle control system (step 908). According to an exemplary embodiment, the remote source and/or the service provided by the remote source is a subscription service that requires a monthly, yearly, or pay-per-use subscription fee, thus generating a constant revenue stream for the owner of the navigation data service offered by the remote source (e.g., navigation server). According to various exemplary embodiments, process 900 may further include steps related to transferring credential information to the remote source for verification.

FIG. 9 illustrates an exemplary process whereby a user requests lodging information from the vehicle control system. In this example, the vehicle control system may forward a request indicating that the lodging information is requested (step 910). It should be noted that process 900 may be modified and/or the vehicle control system may be configured to handle any number of user requests not limited to lodging information. When the request is received by the navigation server, the server may determine lodging information using a database, a further server, information from the Internet, or otherwise (step 912). The lodging information may include address information, phone number information, rate information, name information, images (e.g., of logos, clipart, a photograph of a room), related speech recognition and/or synthesis data, etc.). The lodging information may include attributes for multiple possible lodging choices. The server may then provide a response to the vehicle control system (step 914) via the connections established earlier (e.g., steps 904 through 908). The vehicle control system may store the provided response in a memory device or database. The vehicle control system may also be configured to display and/or playback information and options relating to the request and the response (step 916). For example, if lodging information for multiple lodging choices is received at the vehicle control system, the vehicle control system may display and/or playback a list of the multiple lodging choices. Displaying the lodging information may include displaying lodging choices on a map. Playing back the lodging information may include providing an audio signal to the user, the audio signal including the name of the lodging choice, the distance to the lodging choice, and the rate of the lodging choice.

Referring further to FIG. 9, the vehicle control system may include one or more user graphical or audio user interfaces for allowing the user to choose from the list (step 918). For example, the vehicle control system may be configured to allow the user to manually or audibly command the in-vehicle control system to execute a phone call, to create an send a text message, or to send data or requests to the selected lodging option. The user interfaces may be configured to allow the vehicle occupant to easily communicate with the selected lodging option to make a reservation or the like. According to an exemplary embodiment, the remote source or navigation server is configured to negotiate reservation or booking activities with the selected lodging option. If the navigation server is configured for such an activity, the occupant may know whether or not to continue traveling to the selected lodging option or to select another lodging option. According to various other exemplary embodiments, a communications connection with a remote source, wireless service organization, or network may be used to open a web browser so that the user may view (or have read via a text-to-speech module and audio system) information relating to selected options, reservations thereof, availability thereof, and the like.

Once a lodging choice is selected, the vehicle control system may be configured to request directions or route information based on the selection (step 920). The navigation server may receive the selection (or simply receive an address or GPS coordinate forwarded by the vehicle control system and/or an intermediate device). Using the information received by the navigation server, the server may conduct one or more processing tasks to determine the best route for the vehicle to take to the selected lodging (step 922). Determining the best route may include calculating travel time based on distance, calculating travel time based on traffic, calculating travel time based on weather, calculating travel time based on safety, calculating travel time based on number of turns, stop signs, stop lights, speed limit information, and/or any other attribute. The navigation server provides route information to the vehicle control system (step 924). This route information may be formatted in any number of ways. For example, the route information may be provided from the navigation system to the vehicle control system by providing map information, image information, turn-by-turn information, a text document config-ured to describe the route, a database file configured to describe the route, a markup document configured to describe the route, or otherwise. Using the route information received by the vehicle control system, the vehicle control system may display and/or playback route information (or pieces thereof) via a display and/or audio system (step 926). For example, the vehicle control system may be configured to display a map image received on a display. By way of further example, the vehicle control system may be configured to draw a route on a map pre-stored on the vehicle control system. The vehicle control system may store the received route information in a database, conduct local processing on the vehicle control system, and/or request further information from the intermediate device and/or the remote source. The vehicle control system may also be configured to update a displayed vehicle position on a map and/or along a displayed route (step 928). Further, the vehicle control system may be configured to output audio information (e.g., turn-by-turn instructions) to a vehicle audio system (step 928).

Referring now to FIG. 10, a block diagram of vehicle control system 106 including a radio system 1002 and memory 132 is shown, according to an exemplary embodiment. Memory 132 includes a radio system database 1004. Radio system database 1004 may be a look-up table, database, or other appropriate data structure that stores Radio Data Service (RDS) information along with the broadcast frequency of relevant radio stations and the geographic location of the radio station or its transmitter. For examples, for vehicles located in North America, the relevant radio stations are those located in the United States, Canada, and/or Mexico. The geographic location can be stored as latitude and longitude information that is usable by GPS receivers and other GPS-enabled devices (including GPS system 510).

RDS information may identify the call letters, broadcast genre, and other information (e.g., the song or radio show currently being played) of a radio station. Typically, radio stations that provide RDS information include the information as part of the broadcast signal. RDS-equipped vehicle radio sets (e.g., radio system 1002) extract the RDS information from the broadcast signal and display the information for the driver and/or occupant of the vehicle using a display device included in radio system 1002.

Vehicle control system 106 may use GPS information generated by GPS system 510 (or a PND or other portable GPS receiver located in the vehicle). After receiving the geographic location information identifying the current geographic location of the vehicle from GPS system 510, vehicle control system 106 uses the geographic location information as an input to radio system database 1004 to extract RDS information and broadcast frequency information for radio stations that re or can be assumed to be received by radio system 1002. The extracted RDS and broadcast frequency information is provided by memory 132 to vehicle control system 106, which displays the information to the driver and/or occupant using an output display and/or other display device included in radio system 1002 of the vehicle.

In various exemplary embodiments, vehicle control system 106 can search radio system database 1004 not only for all nearby radio stations, but also for nearby radio stations that broadcast a selected genre (e.g., a genre-based search). Typical genres of radio stations may include, but are not limited to, classic rock, modern rock, alternative, 70's, 80's, oldies, news talk, sports talk, national public radio (NPR), country, country and western, etc. The driver or occupant of the vehicle may provide a voice or tactile command using the various control structures as described in FIG. 2 and elsewhere to select the genre.

Radio system database 1004 may be configured to update information stored within database 1004 at regular intervals, as radio stations may change broadcast genres, station call letters, transmitter locations and strengths, and other properties at any given time. There may be a variety of methods for updating database 1004, either manually, via a wireless connection with another database, etc.

It should be appreciated that an older-model vehicle may not include all of the vehicle control system 106 and associated components as described in FIG. 2, and radio system 1002 connected to a radio system database 1004. In this case, the functions and capabilities outlined in FIG. 10A may be integrated into a stand-alone radio set, which may be provided with the ability to connect (via a wired or wireless connection) to GPS system 510. It should also be appreciated that web sites and services (e.g., a web site providing radio station location features and/or other radio station information) that have a database in a searchable format of radio stations, broadcast genres, city proximity, etc., may be used to update database 1004 or to be augmented with GPS location information of the radio stations, their broadcast range, and/or other desirable information about the radio stations. It should also be appreciated that, in various exemplary embodiments, a portable wireless device used with vehicle control system 106 may be used as a drive identification device, such that when a particular portable wireless device that is associated with a specific driver is brought into the vehicle, vehicle control system 106 may pull data from memory 132 and makes the data active. For example, the data may be specific navigation data last used by the specific driver or data, a playlist, etc.

In some cases, where a vehicle is being driven a long distance and/or through an area where the driver or occupant is unfamiliar with the local radio stations, there is no guarantee that a vehicle may not be driven outside a radio station's broadcast range at any given time.

Figure 10A:
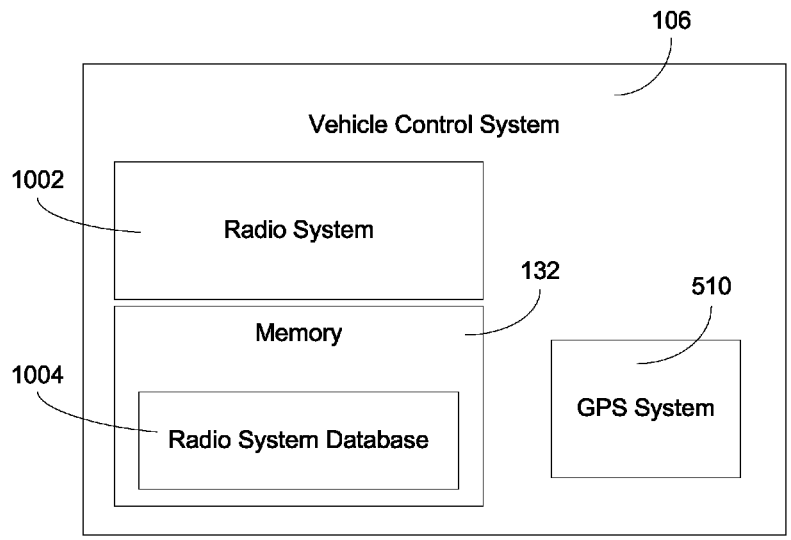
FIG. 10 is a block diagram of a vehicle control system including a radio system and memory, according to an exemplary embodiment.
Figure 10B:
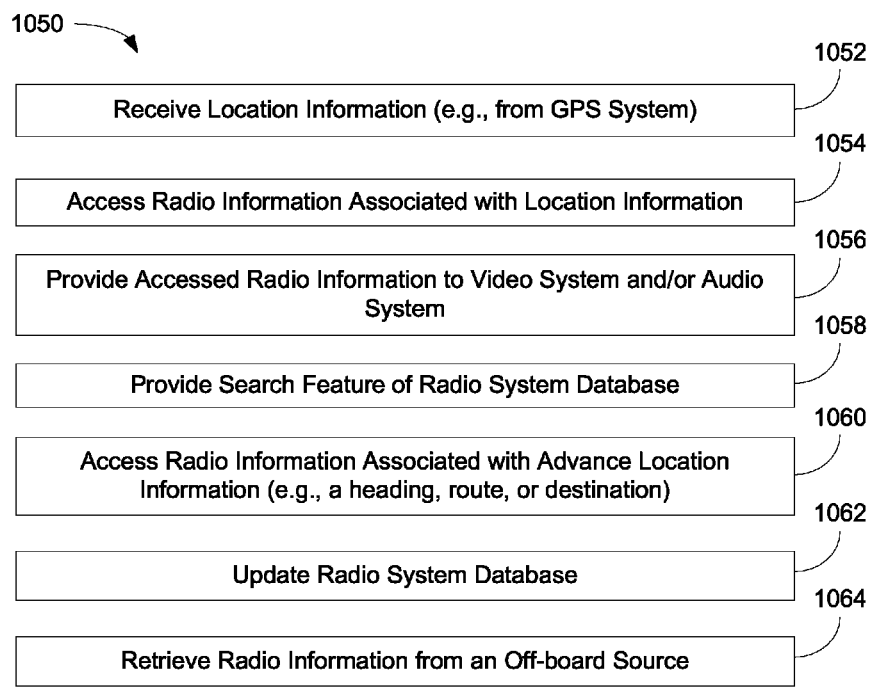

Referring to FIG. 10B, a flow diagram of a method 1050 of determining available radio stations based on a route or destination is shown, according to an exemplary embodiment. Current location information is received by the vehicle control system from the GPS system (step 1052). The location information may be used to determine a heading, direction, route or destination of the vehicle. The vehicle control system may access the radio system database for radio information associated with the location of the vehicle (step 1054). For example, radio information for radio stations "ahead" of the vehicle (e.g., in the direction the vehicle is traveling) may be found. Alternatively, radio stations may be found within a radius length of the vehicle, within the zip code or city limits associated with the location of the vehicle, based on broadcast signal strength, or via any other radio station location property.

The resulting radio information may be provided to a video and/or audio system of the vehicle (step 1056). A search feature of the radio system database may also be provided, allowing a driver or occupant of the vehicle to search for radio information (step 1058). According to various exemplary embodiments, the search feature may be provided at any time to a driver or occupant of the vehicle. Using the location of the vehicle and an input from the search feature, radio information associated with an advance location of the vehicle may be accessed and provided (step 1060). The information may be accessed at any time by a driver or occupant of the vehicle, according to various exemplary embodiments. A radio station may be chosen such that the vehicle may drive into broadcast range of the station instead of away from. The radio information may be RDS information as described in FIG. 10A.

The radio system database may then be updated (step 1062). The updating may be performed at various times, either automatically or via a manual user command, according to various exemplary embodiments. In various exemplary embodiments, the entire database may be updated at once. In various other exemplary embodiments, the vehicle control system may provide current GPS location data for the vehicle obtained from a GPS system. A remote source may download the information for radio stations located in the vicinity of the current location of the vehicle to the radio system database, allowing all nearby radio station information to be updated. In yet other various exemplary embodiments, the radio system database may be updated only for radio stations having changed information (e.g., call letters, broadcast genre, etc.) since a given date or time period.

Radio information may be retrieved from an off-board source (e.g., via a wireless connection, etc.) (step 1064). For example, the radio system database may be updated during a service call at a dealership or other location that handles the brand or manufacturer of the vehicle. In this case, the memory of the vehicle control system may include a reprogrammable ROM, flash memory, etc., that is used to store database information. A direct connection or a connection via a wired or wireless connection may be made to the vehicle control system to supply information to the radio system database. In other various exemplary embodiments, the driver or occupant commands the vehicle control system to create a wireless or wired connection to a data source. For example, the vehicle control system can use a communication device and a mobile phone that may connect to the vehicle control system to access updated information from the radio system database.

The heading-based search may be combined with the genre-based search as described in FIG. 10A. The driver or occupant of the vehicle may use the various control structures as described in FIG. 2 to initiate the heading-based search.

Figure 11:
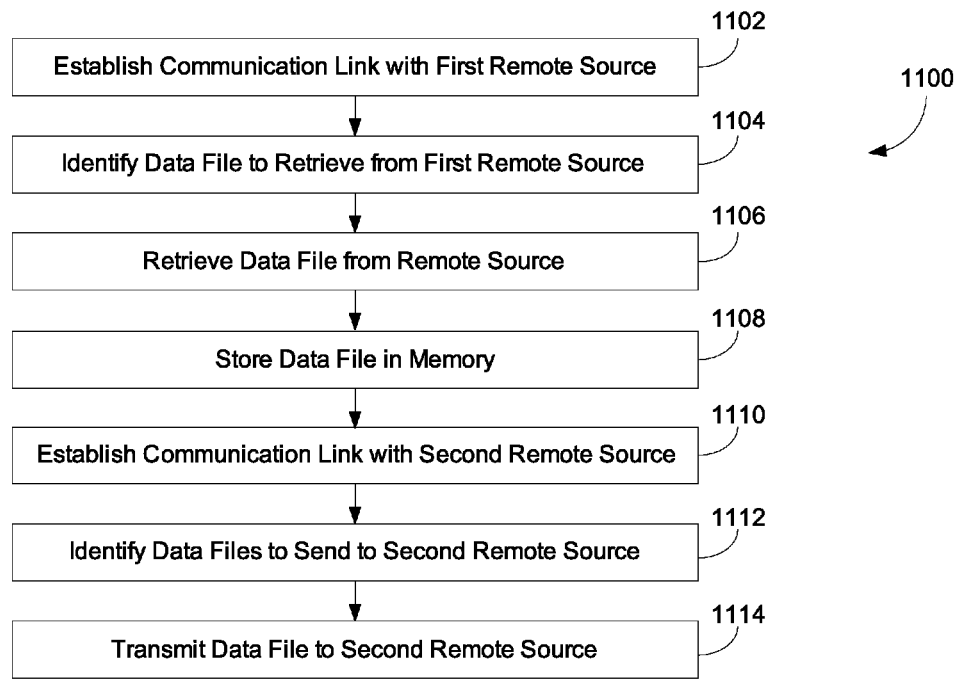
FIG. 11 is a flow diagram of a process illustrating a method of transferring files from a first remote source to a second remote source, according to an exemplary embodiment.

Referring to FIG. 11, a process 1100 for transferring files from a first remote source to a second remote source is illustrated, according to an exemplary embodiment. In the event that the vehicle control system experiences difficulty accessing files from a remote source while traveling, when a vehicle control system does not include "on the fly" download and display features, or in any other event, a user of a vehicle control system may download information to a portable device prior to beginning traveling in the vehicle. For example, the driver can download the direction information to a cell phone or laptop computer, and then connect (wireless or via a wired connection) to the cell phone or laptop computer before or while driving to obtain desired information. Access to one remote source can also be used to provide information to a second remote source. In-vehicle control system can, according to an exemplary embodiment, be used to synchronize a data file of a first remote source, a second remote source, and/or the vehicle control system. Process 1100 shown in FIG. 11 relates to the process of transferring a file or other data from a GPS system or other source to a radio system database as described in FIGS. 10A and 10B. The vehicle control system establishes a communication link with a first remote source (step 1102). The remote source may be the remote source of FIG. 5 or any other remote source. The vehicle control system identifies data files to retrieve from the first remote source (step 1104)

and retrieves the data (step 1106). The vehicle control system may then store the data file in memory (step 1108). The vehicle control system then establishes a communication link with a second remote source (step 1110). The vehicle control system identifies the data files to send to the second remote source (step 1112) and transmits the data files (step 1114).

Figure 12:
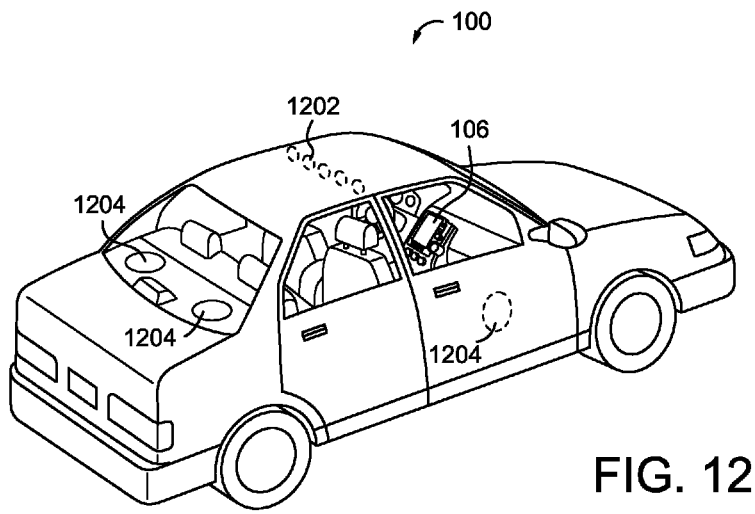
FIG. 12 is a perspective view of a motor vehicle that includes a sound system with a plurality of speakers, according to an exemplary embodiment.

Referring to FIG. 12, vehicle 100 is shown including a number of subsystems for user convenience and entertainment. Vehicle 100 has in-vehicle control system 106 (e.g., media system, navigational system, entertainment system, etc.) as described in FIGS. 1-4. Vehicle 100 has an entertainment system that transmits sound waves via overhead speakers 1202 and non-overhead speakers 1204. The location of overhead speakers 1202 and non-overhead speakers 1204 may vary according to various implementations of speakers 1202 and 1204. For example, overhead speaker 1202 may be placed in various locations on the roof of vehicle 100 and non-overhead speakers 1204 are shown in the back and on the doors of vehicle 100 but may be installed at any other location within vehicle 100. The entertainment system may be coupled to in-vehicle control system 106, which is capable of automatically or manually controlling and monitoring both systems. It is noted that in various exemplary embodiments, vehicle 100, the entertainment system, and other vehicle systems may be of any past, present, or future design capable of interacting with in-vehicle control system 106. Any past, present, or future design of a device capable of producing sound is within the scope of the term speaker. An entertainment system may be a radio, digital video player, digital audio player, video game or any combination thereof. The entertainment system includes an audio data source configured to generate a signal and an overhead audio output device, which is configured to generate an audible sound resulting from the signal received from the audio data source.

Referring to FIG. 13, a method 1300 for speech-enabled dialing using a mobile phonebook is illustrated according to one exemplary embodiment. In-vehicle control system 106 will automatically dial a number on a hands-free phone set using speech recognition of user commands. According to various exemplary embodiments, method 1300 may be used for a variety of vehicle components and systems (e.g., HVAC system, calendar system, etc.) to provide a speech-enabled way to obtain information.

In-vehicle control system 106 receives a command to initiate a phone call from a user via audio input device 128 (step 1302). In-vehicle control system 106 prompts the user to provide an entry name (step 1304). The prompt may be played via audio output device 130 or the sound system. The user may provide the entry name with an oral command to initiate a call (e.g., "call <entry name>") (step 1306). In-vehicle control system 106 prompts the user to confirm the entry provided at step 1306 (step 1308). In-vehicle control system 106 may receive oral confirmation or confirmation via user interface 126 (e.g., a button or switch) from the user that the correct entry was provided (step 1310). If confirmation was received at step 1310, speech recognition device 136 compares the command with the mobile phonebook entries and system phonebook entries and identifies the desired mobile phonebook entry (step 1312). If there are similar entries in the system phonebook and the mobile phonebook, the speech recognition device may select the best match. The speech recognition device determines if there is more than one number associated with the desired entry (e.g., the entry includes a home number and a work number) (step 1314). In the event that there is more than one number associated with the entry, in-vehicle control system 106 may list the numbers in the entry via an audible prompt on audio output device 130 or via a visual prompt on output display 108. In an exemplary embodiment where an audible prompt is given, text-to-speech device 138 may be used to convert the numbers to audio output. The user may then select the appropriate number via an oral command or user interface 126 (e.g., a button or switch) (step 1316). Once a number has been determined, in-vehicle control system 106 sends the phone number to mobile phone 144 via communications link 118 and the number is dialed (step 1318).

Referring to FIG. 14, in-vehicle control system 106 is also configured to provide a user with a listing of the mobile phonebook entries upon request. A method 1400 for audibly listing phone entries of a mobile phonebook in accordance with one exemplary embodiment is illustrated. In-vehicle control system 106 receives an oral command from the user via an audio input device 128 to list the contents of the mobile phonebook (step 1402). In response to the oral command, in-vehicle control system 106 plays the text of each entry (step 1404). The text (e.g., name text) of each entry is converted to an audio representation using text-to-speech device 138 and the audio may be played in the vehicle over audio output device 130 or the sound system. Preferably, the text of the entries is also shown on output display 108 in alphanumeric order sorted character by character. A predetermined time period elapses between the playing of each entry. In-vehicle control system 106 is be configured to allow the user to interrupt the audible listing of the phonebook entries by permitting the user to "barge-in" (step 1406). A user may barge in during the playing of an entry text or during a predetermined time after the playing of the entry in order to execute a command given orally to audio input device 128 or via user interface 126 (e.g., a button or switch). If the user provides a command and "barges in," in-vehicle control system 106 recognizes and performs the requested action (step 1408). For example, a user may provide a command to skip to the next entry or to skip to an entry beginning at the next alphanumeric character. A user may also provide commands to select a desired entry once it is heard or to repeat a previous entry. If an entry is selected, a user may then, for example, initiate a call or transfer the entry to the system phonebook. At step 1410, in-vehicle control system 106 determines whether the last entry has been reached or if an entry has been selected. If the last entry has been reached or if an entry has been selected, in-vehicle control system 106 ends method 1400. If the last entry has not been reached, method 1400 returns to step 1404 and continues until either an entry is selected or the last entry in the mobile phonebook is reached.

Although many of the exemplary embodiments described in the present application relate to off-board route calculation for navigation purposes, it should be appreciated that the systems and methods described in the present application can be modified for other activities. For example, a vehicle control system may include appropriate user interfaces and/or communications hardware and/or software for requesting financial information (e.g., stock price information), world news information, local news information, phone directory information, calendar information, weather information, e-mail information, and/or text message information, etc. This information can be transmitted from a remote source to a vehicle control system in response to a request originating at the remote source. Further, it should be noted that the remote source may be any object or device equipped with suitable communications hardware and/or software for communicating information to a vehicle control system (or connected intermediate device, connected WSO, etc.). A remote source, according to various exemplary embodiments, may be a gasoline pump, a road sign, a freeway overpass, a traffic light, a coffee shop hotspot, a commercial sign, a home wireless LAN, and/or other points along a road, highway, or otherwise. According to another exemplary embodiment, the remote source is configured to store and/or retrieve weather information (e.g., weather radar images, weather database information, weather descriptions, markup files describing weather, etc.). A vehicle control system may be configured to request weather information from the remote source. The vehicle control system can be configured to display and/or playback the weather information via a vehicle display system and/or a vehicle audio system. According to an exemplary embodiment, weather information can be mixed with navigation information on a display. For example, the vehicle control system may receive weather images and overlay the map images on a navigation map. According to yet other exemplary embodiments, the vehicle control system utilizes weather information to generate weather icons and/or other weather graphics for overlaying onto a map image.

Describing the invention with Figures should not be construed as imposing on the invention any limitations that may be present in the Figures. The present invention contemplates methods, systems and program products on any machine-readable media for accomplishing its operations. The embodiments of the present invention may be implemented using an existing computer processors, or by a special purpose computer processor for an appropriate vehicle system, incorporated for this or another purpose or by a hardwired system.

It is important to note that the construction and arrangement of the control system as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements (e.g., control system 106, memory device 132, communications device 120, data processing device 122, remote source 116, remote server 154, etc.), the position of elements may be reversed or otherwise varied (e.g., the components of control system 106, etc.), and the nature or number of discrete elements or positions may be altered or varied (e.g., communications device 120, memory device 132, the components of control system 106, etc.). Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present inventions as expressed in the appended claims.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software implementations of the present invention could be accomplished with standard programming techniques with rule based logic and other logic to accomplish the various connection steps, processing steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A system for mounting in a vehicle and for providing route information from a remote source to a display, the system comprising:
    a display interface for providing a signal to the display;
    a user input device configured to receive vehicle occupant input;
    a communications device;
    and
    a processor operatively coupled to the communications device, the user input device, and the display interface, wherein the processor is configured to receive a signal corresponding to the vehicle occupant input and determine whether the vehicle occupant input indicates a request for directions or selection of a remote direction provider for providing route information;

wherein, in response to a determination that the vehicle occupant input indicates a request for directions, the processor is configured to cause vehicle position information to be sent to the remote source via the communications device;

wherein the processor is configured to receive route information from the remote source via the communications device, wherein, in response to a determination that the vehicle occupant input indicates a selection of a remote direction provider, the processor is configured to generate instructions configured to cause the remote source to provide the route information from the selected remote direction provider and transmit the instructions via the communications device to the remote source;

wherein the processor is further configured to provide to the display interface a representation of the route information received from the selected remote direction provider, the route information conveying directions from a position of the vehicle to a destination.

2. The system of claim 1, wherein the communications device is configured for wireless communications.

3. The system of claim 1, wherein a command relating to the route information is provided to a vehicle audio system, the vehicle audio system including an overhead audio output device, the overhead audio output device aimed toward the windscreen of the vehicle.

4. The system of claim 1, further comprising:
an interface to a global positioning system, wherein the processor is configured to receive the vehicle position information from the interface to the global positioning system.

5. The system of claim 1, wherein the processor is configured to receive a file from the remote source via the communications device.

6. The system of claim 5, further comprising:
a memory device communicably connected to the processor; wherein the processor is configured to store the file in the memory device and wherein the processor is configured to cause the communications device to establish a communications link with a second remote source, and wherein the processor is configured to send the file stored in the memory device to the second remote source.

7. The system of claim 1, wherein the processor is further configured to parse weather information received at the communications device from the remote source, and wherein the processor is configured to overlay a representation of the weather information on a navigational map with the representative of the route information.

8. The system of claim 1, further comprising:
an interface to a vehicle module, the vehicle module configured to provide at least one of speed information and heading information to the processor, wherein the processor is configured to update the vehicle position information using the speed information, the heading information, or both the speed and the heading information and to cause the communications device to transmit a route information request including the updated vehicle position information and a desired destination to the remote source.

9. A computerized method for providing a representation of directions from a remote source to a display interface for providing a signal to a display system mounted in a vehicle, the directions being directions from a vehicle position to a destination, the method comprising:
receiving, at a processor local to the vehicle, a remote source selection from a user input device;

formatting a request, using the processor, for transmission via a communications device coupled to the vehicle, wherein the request is a request configured to cause the selected remote source to provide directions from a vehicle position to a destination;

retrieving vehicle position information from a device for determining position coupled to the vehicle;

transmitting, using the communications device, the request and vehicle position information to the selected remote source;

receiving the directions from the selected remote source via the communications device coupled to the vehicle;

generating a map image using the processor, the map image including a representation of the directions; and providing the map image including the representation of the directions to the display interface located in the vehicle.

10. The method of claim 9, further comprising:
retrieving radio station information based on the vehicle position information.

11. The system of claim 1, wherein the route information is determined by the remote source and wherein the processor is configured to provide the route information to a second remote source.

12. The system of claim 11, wherein the processor is configured to receive information from the second remote source which provides at least one of traffic information, weather information, vehicle speed information, other vehicle information, or a time of day.

13. The system of claim 7, wherein the remote source accesses weather information from a second remote source.

14. The method of claim 9, further comprising:
transmitting direction information to a second remote source.

15. The method of claim 14, receiving, at the processor and from the second remote source, at least one of traffic information, weather information, vehicle speed information, other vehicle information, or a time of day.

16. The method of claim 9, further comprising:
receiving, using the communications device, weather information from the selected remote source; and
overlaying, using the processor, a representation of the weather information on the map image including the representation of the directions.

17. The method of claim 16, wherein the weather information is accessed from a second remote source.

18. The system of claim 1, wherein the processor is further configured to:
receive an indication of an event;
request second route information from the remote source in response to receiving the indication;
receive second route information from the remote source;
request user confirmation at the user input device for altering displayed directions based on the event; and
provide a representation of a new set of directions for the new route to the display interface in response to receiving the user confirmation.

19. The method of claim 9, further comprising:
receiving an indication of an event at the processor;
requesting second route information from the remote source in response to receiving the indication;
receive second route information from the remote source;
requesting user confirmation at the user input device for altering displayed directions based on the event; and
providing a new map image of a new set of directions for the new route to the display interface in response to receiving the user confirmation.

* * * * *